(12) United States Patent
Abdallah

(10) Patent No.: US 9,940,134 B2
(45) Date of Patent: Apr. 10, 2018

(54) DECENTRALIZED ALLOCATION OF RESOURCES AND INTERCONNECT STRUCTURES TO SUPPORT THE EXECUTION OF INSTRUCTION SEQUENCES BY A PLURALITY OF ENGINES

(75) Inventor: Mohammad Abdallah, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 505 days.

(21) Appl. No.: 13/475,708

(22) Filed: May 18, 2012

(65) Prior Publication Data

US 2012/0297170 A1    Nov. 22, 2012

Related U.S. Application Data

(60) Provisional application No. 61/488,662, filed on May 20, 2011.

(51) Int. Cl.
    *G06F 9/46*     (2006.01)
    *G06F 9/30*     (2018.01)
    (Continued)

(52) U.S. Cl.
    CPC .......... *G06F 9/3005* (2013.01); *G06F 9/384* (2013.01); *G06F 9/3824* (2013.01);
    (Continued)

(58) Field of Classification Search
    CPC .... G06F 9/3824; G06F 9/3836; G06F 9/3851; G06F 9/3891; G06F 9/5005
    See application file for complete search history.

(56) References Cited

U.S. PATENT DOCUMENTS

| 727,487 A | 5/1903 | Swan |
|---|---|---|
| 4,075,704 A | 2/1978 | O'Leary |

(Continued)

FOREIGN PATENT DOCUMENTS

| CN | 1214666 A | 4/1999 |
|---|---|---|
| CN | 1305150 A | 7/2001 |

(Continued)

OTHER PUBLICATIONS

Non-Final Office Action; Mail Date Sep. 2, 2014; U.S. Appl. No. 13/475,739.

(Continued)

*Primary Examiner* — James J Lee
(74) *Attorney, Agent, or Firm* — NDWE LLP

(57) ABSTRACT

A method for decentralized resource allocation in an integrated circuit. The method includes receiving a plurality of requests from a plurality of resource consumers of a plurality of partitionable engines to access a plurality resources, wherein the resources are spread across the plurality of engines and are accessed via a global interconnect structure. At each resource, a number of requests for access to said each resource are added. At said each resource, the number of requests are compared against a threshold limiter. At said each resource, a subsequent request that is received that exceeds the threshold limiter is canceled. Subsequently, requests that are not canceled within a current clock cycle are implemented.

21 Claims, 15 Drawing Sheets

(51) Int. Cl.
*G06F 9/38* (2018.01)
*G06F 9/50* (2006.01)
*G06F 13/16* (2006.01)
*G06F 13/40* (2006.01)

(52) U.S. Cl.
CPC .......... *G06F 9/3836* (2013.01); *G06F 9/3838* (2013.01); *G06F 9/3851* (2013.01); *G06F 9/3885* (2013.01); *G06F 9/3891* (2013.01); *G06F 9/5005* (2013.01); *G06F 13/1673* (2013.01); *G06F 13/1689* (2013.01); *G06F 13/4068* (2013.01)

(56) References Cited

U.S. PATENT DOCUMENTS

| | | |
|---|---|---|
| 4,245,344 A | 1/1981 | Richter |
| 4,356,550 A | 10/1982 | Katzman et al. |
| 4,414,624 A | 11/1983 | Summer, Jr. et al. |
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,727,487 A | 2/1988 | Masui et al. |
| 4,816,991 A | 3/1989 | Watanabe et al. |
| 4,835,680 A | 5/1989 | Hogg et al. |
| 4,920,477 A | 4/1990 | Colwell et al. |
| 4,930,066 A * | 5/1990 | Yokota ............... G06F 13/1647 711/149 |
| 4,943,909 A | 7/1990 | Huang |
| 5,197,130 A | 3/1993 | Chen et al. |
| 5,294,897 A | 3/1994 | Notani et al. |
| 5,317,705 A | 5/1994 | Gannon et al. |
| 5,317,754 A | 5/1994 | Blandy et al. |
| 5,339,398 A | 8/1994 | Shah et al. |
| 5,404,470 A | 4/1995 | Miyake |
| 5,469,376 A | 11/1995 | Abdallah |
| 5,471,593 A | 11/1995 | Branigin |
| 5,509,130 A | 4/1996 | Trauben et al. |
| 5,517,651 A | 5/1996 | Huck et al. |
| 5,524,090 A | 6/1996 | Iwamura |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,590,084 A | 12/1996 | Miyano et al. |
| 5,634,068 A | 5/1997 | Nishtala et al. |
| 5,649,136 A | 7/1997 | Shen et al. |
| 5,675,759 A | 10/1997 | Shebanow et al. |
| 5,699,537 A | 12/1997 | Sharangpani et al. |
| 5,710,902 A | 1/1998 | Sheaffer et al. |
| 5,724,565 A | 3/1998 | Dubey et al. |
| 5,751,982 A | 5/1998 | Morley |
| 5,752,260 A | 5/1998 | Liu |
| 5,754,818 A | 5/1998 | Mohamed |
| 5,761,476 A | 6/1998 | Martell |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,819,088 A | 10/1998 | Reinders |
| 5,829,028 A | 10/1998 | Lynch et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,901,294 A | 5/1999 | Tran et al. |
| 5,903,750 A | 5/1999 | Yeh et al. |
| 5,905,509 A | 5/1999 | Jones et al. |
| 5,911,057 A | 6/1999 | Shiell |
| 5,918,251 A | 6/1999 | Yamada et al. |
| 5,956,753 A | 9/1999 | Glew et al. |
| 5,974,506 A | 10/1999 | Sicola et al. |
| 5,978,906 A | 11/1999 | Tran |
| 5,983,327 A * | 11/1999 | Achilles ............... G06F 13/1605 365/189.02 |
| 6,016,533 A | 1/2000 | Tran |
| 6,016,540 A | 1/2000 | Zaidi et al. |
| 6,021,484 A | 2/2000 | Park |
| 6,065,105 A | 5/2000 | Zaidi et al. |
| 6,073,230 A | 6/2000 | Pickett et al. |
| 6,075,938 A | 6/2000 | Bugnion et al. |
| 6,085,315 A | 7/2000 | Fleck et al. |
| 6,088,780 A | 7/2000 | Yamada et al. |
| 6,092,172 A | 7/2000 | Nishimoto et al. |
| 6,101,577 A | 8/2000 | Tran |
| 6,108,769 A | 8/2000 | Chinnakonda et al. |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,170,051 B1 | 1/2001 | Dowling |
| 6,178,482 B1 | 1/2001 | Sollars |
| 6,185,660 B1 | 2/2001 | Mulla et al. |
| 6,205,545 B1 | 3/2001 | Shah et al. |
| 6,209,085 B1 | 3/2001 | Hammond et al. |
| 6,212,542 B1 | 4/2001 | Kahle et al. |
| 6,212,613 B1 | 4/2001 | Belair |
| 6,216,215 B1 | 4/2001 | Palanca et al. |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,269,439 B1 | 7/2001 | Hanaki |
| 6,272,616 B1 | 8/2001 | Fernando et al. |
| 6,272,662 B1 | 8/2001 | Jadav et al. |
| 6,275,917 B1 | 8/2001 | Okada |
| 6,282,583 B1 | 8/2001 | Pincus et al. |
| 6,282,638 B1 | 8/2001 | Dowling |
| 6,308,323 B1 | 10/2001 | Douniwa |
| 6,321,298 B1 | 11/2001 | Hubis |
| 6,327,650 B1 | 12/2001 | Bapst et al. |
| 6,332,189 B1 | 12/2001 | Baweja et al. |
| 6,339,822 B1 | 1/2002 | Miller |
| 6,341,324 B1 | 1/2002 | Caulk, Jr. et al. |
| 6,345,357 B1 | 2/2002 | Sato |
| 6,360,311 B1 | 3/2002 | Zandveld et al. |
| 6,408,367 B2 | 6/2002 | Achilles et al. |
| 6,437,789 B1 | 8/2002 | Tidwell et al. |
| 6,449,671 B1 | 9/2002 | Patkar et al. |
| 6,457,120 B1 | 9/2002 | Sinharoy |
| 6,473,833 B1 * | 10/2002 | Arimilli ............... G06F 12/0897 711/118 |
| 6,490,673 B1 | 12/2002 | Heishi et al. |
| 6,502,187 B1 | 12/2002 | Miyagawa |
| 6,529,928 B1 | 3/2003 | Resnick et al. |
| 6,542,984 B1 | 4/2003 | Keller et al. |
| 6,557,083 B1 | 4/2003 | Sperber et al. |
| 6,557,095 B1 | 4/2003 | Henstrom |
| 6,594,755 B1 | 7/2003 | Nuechterlein |
| 6,604,187 B1 | 8/2003 | McGrath et al. |
| 6,609,189 B1 | 8/2003 | Kuszmaul et al. |
| 6,615,340 B1 | 9/2003 | Wilmot, II |
| 6,658,549 B2 | 12/2003 | Wilson et al. |
| 6,668,316 B1 | 12/2003 | Gorshtein et al. |
| 6,681,395 B1 | 1/2004 | Nishi |
| 6,704,860 B1 | 3/2004 | Moore |
| 6,721,874 B1 | 4/2004 | Le et al. |
| 6,728,866 B1 | 4/2004 | Kahle et al. |
| 6,775,761 B2 | 8/2004 | Wang et al. |
| 6,829,698 B2 | 12/2004 | Arimilli et al. |
| 6,882,177 B1 | 4/2005 | Reddy et al. |
| 6,907,600 B2 | 6/2005 | Neiger et al. |
| 6,912,644 B1 | 6/2005 | O'Connor et al. |

(56) References Cited

U.S. PATENT DOCUMENTS

| | | |
|---|---|---|
| 6,920,530 B2 | 7/2005 | Musumeci |
| 6,944,744 B2 | 9/2005 | Ahmed et al. |
| 6,948,172 B1 | 9/2005 | D'Souza |
| 6,950,927 B1 | 9/2005 | Apisdorf et al. |
| 6,954,846 B2 | 10/2005 | Leibholz et al. |
| 6,985,591 B2 | 1/2006 | Graunke |
| 6,988,183 B1 | 1/2006 | Wong |
| 7,007,108 B2 | 2/2006 | Emerson et al. |
| 7,020,879 B1 | 3/2006 | Nemirovsky et al. |
| 7,047,322 B1 | 5/2006 | Bauman et al. |
| 7,111,145 B1 | 9/2006 | Chen et al. |
| 7,117,347 B2 | 10/2006 | Col et al. |
| 7,139,855 B2 | 11/2006 | Armstrong |
| 7,143,273 B2 | 11/2006 | Miller et al. |
| 7,149,872 B2 | 12/2006 | Rozas et al. |
| 7,150,021 B1 | 12/2006 | Vajjhala |
| 7,171,535 B2 | 1/2007 | Naoi |
| 7,203,824 B2 | 4/2007 | Bean et al. |
| 7,206,925 B1 | 4/2007 | Jacobson et al. |
| 7,213,106 B1 | 5/2007 | Koster et al. |
| 7,213,248 B2 | 5/2007 | Arimilli et al. |
| 7,231,106 B2 | 6/2007 | Basavanhally et al. |
| 7,257,695 B2 | 8/2007 | Jiang et al. |
| 7,278,030 B1 | 10/2007 | Chen et al. |
| 7,284,092 B2 | 10/2007 | Nunamaker et al. |
| 7,290,261 B2 | 10/2007 | Burky et al. |
| 7,313,775 B2 | 12/2007 | Casey et al. |
| 7,343,476 B2 | 3/2008 | Floyd et al. |
| 7,373,637 B2 | 5/2008 | Dewitt et al. |
| 7,380,096 B1 | 5/2008 | Rozas et al. |
| 7,383,427 B2 | 6/2008 | Yamazaki |
| 7,398,347 B1 | 7/2008 | Pechanek et al. |
| 7,406,581 B2 | 7/2008 | Southwell et al. |
| 7,418,579 B2 | 8/2008 | Guibert et al. |
| 7,418,582 B1 | 8/2008 | Iacobovici et al. |
| 7,441,110 B1 | 10/2008 | Puzak et al. |
| 7,493,475 B2 | 2/2009 | Colavin |
| 7,539,879 B2 | 5/2009 | Terechko et al. |
| 7,546,420 B1 | 6/2009 | Shar et al. |
| 7,577,820 B1 | 8/2009 | Wentzlaff et al. |
| 7,617,384 B1 | 11/2009 | Coon et al. |
| 7,634,637 B1 | 12/2009 | Lindholm et al. |
| 7,647,483 B2 | 1/2010 | Bates et al. |
| 7,680,988 B1 | 3/2010 | Nickolls et al. |
| 7,681,019 B1 | 3/2010 | Favor |
| 7,707,397 B2 | 4/2010 | Henry et al. |
| 7,707,578 B1 | 4/2010 | Zedlewski et al. |
| 7,711,929 B2 | 5/2010 | Burky et al. |
| 7,716,460 B2 | 5/2010 | Stempel et al. |
| 7,757,065 B1 | 7/2010 | Jourdan et al. |
| 7,770,161 B2 | 8/2010 | Mitran et al. |
| 7,783,868 B2 | 8/2010 | Ukai |
| 7,783,869 B2 | 8/2010 | Grandou et al. |
| 7,809,925 B2 | 10/2010 | Mejdrich et al. |
| 7,848,129 B1 | 12/2010 | Deshpande et al. |
| 7,856,530 B1 | 12/2010 | Mu |
| 7,861,060 B1 | 12/2010 | Nickolls et al. |
| 7,877,582 B2 | 1/2011 | Gschwind et al. |
| 7,913,058 B2 | 3/2011 | Rozas et al. |
| 7,925,869 B2 | 4/2011 | Kelsey et al. |
| 8,044,951 B1 | 10/2011 | Brown et al. |
| 8,046,775 B2 | 10/2011 | Kang et al. |
| 8,082,420 B2 | 12/2011 | Comparan et al. |
| 8,108,545 B2 | 1/2012 | Arimilli et al. |
| 8,145,844 B2 | 3/2012 | Bruce |
| 8,145,880 B1 | 3/2012 | Cismas et al. |
| 8,145,882 B1 | 3/2012 | Kishore et al. |
| 8,200,949 B1 | 6/2012 | Tarjan et al. |
| 8,219,996 B1 | 7/2012 | Morris |
| 8,230,423 B2 | 7/2012 | Frigo et al. |
| 8,239,656 B2 | 8/2012 | Rozas et al. |
| 8,301,847 B2 | 10/2012 | Dantzig et al. |
| 8,316,435 B1 | 11/2012 | Varadhan et al. |
| 8,327,115 B2 | 12/2012 | Abdallah |
| 8,438,366 B2 | 5/2013 | Akizuki et al. |
| 8,522,253 B1 | 8/2013 | Rozas et al. |
| 8,539,486 B2 | 9/2013 | Cain, III et al. |
| 8,645,965 B2 | 2/2014 | Zimmer et al. |
| 8,756,329 B2 | 6/2014 | Reynolds et al. |
| 8,868,838 B1 | 10/2014 | Glasco et al. |
| 8,930,674 B2 | 1/2015 | Avudaiyappan et al. |
| 9,047,178 B2 | 6/2015 | Talagala et al. |
| 9,135,003 B2 | 9/2015 | Suh et al. |
| 2001/0016901 A1 | 8/2001 | Topham |
| 2001/0032303 A1 | 10/2001 | Pechanek et al. |
| 2001/0049782 A1 | 12/2001 | Hsu et al. |
| 2002/0029308 A1 | 3/2002 | Babaian et al. |
| 2002/0062435 A1 | 5/2002 | Nemirovsky et al. |
| 2002/0069326 A1 | 6/2002 | Richardson et al. |
| 2002/0082824 A1 | 6/2002 | Neiger et al. |
| 2002/0083312 A1 | 6/2002 | Sinharoy |
| 2002/0099913 A1 | 7/2002 | Steely et al. |
| 2002/0126657 A1 | 9/2002 | Frouin et al. |
| 2002/0129085 A1 | 9/2002 | Kubala et al. |
| 2002/0174321 A1* | 11/2002 | John ................ G06F 9/3836 712/218 |
| 2002/0188833 A1 | 12/2002 | Henry et al. |
| 2003/0035422 A1* | 2/2003 | Hill ................ H04L 49/30 370/389 |
| 2003/0065887 A1 | 4/2003 | Maiyuran et al. |
| 2003/0088752 A1 | 5/2003 | Harman |
| 2003/0093776 A1 | 5/2003 | Hilton |
| 2003/0101322 A1 | 5/2003 | Gardner |
| 2003/0101444 A1 | 5/2003 | Wu et al. |
| 2003/0126408 A1 | 7/2003 | Vajapeyam et al. |
| 2003/0131335 A1 | 7/2003 | Hamlin |
| 2003/0149862 A1 | 8/2003 | Kadambi |
| 2003/0163642 A1* | 8/2003 | Borkenhagen ...... G06F 12/0837 711/121 |
| 2003/0169626 A1* | 9/2003 | Burk et al. ................ 365/200 |
| 2003/0200396 A1 | 10/2003 | Musumeci |
| 2003/0200412 A1 | 10/2003 | Peinado et al. |
| 2003/0202530 A1* | 10/2003 | Jenkins et al. ................ 370/447 |
| 2003/0225938 A1 | 12/2003 | Glasco et al. |
| 2003/0226001 A1 | 12/2003 | Moyer et al. |
| 2003/0233394 A1 | 12/2003 | Rudd et al. |
| 2004/0034762 A1 | 2/2004 | Kacevas |
| 2004/0044850 A1 | 3/2004 | George et al. |
| 2004/0064668 A1 | 4/2004 | Kjos et al. |
| 2004/0073909 A1 | 4/2004 | Arimilli et al. |
| 2004/0078538 A1 | 4/2004 | Dutt et al. |
| 2004/0093483 A1 | 5/2004 | Nguyen et al. |
| 2004/0098567 A1 | 5/2004 | Hansen et al. |
| 2004/0103251 A1 | 5/2004 | Alsup |
| 2004/0117593 A1 | 6/2004 | Uhlig et al. |
| 2004/0117594 A1 | 6/2004 | Vanderspek |
| 2004/0122887 A1 | 6/2004 | Macy |
| 2004/0138857 A1 | 7/2004 | Souza et al. |
| 2004/0139441 A1 | 7/2004 | Kaburaki et al. |
| 2004/0143727 A1 | 7/2004 | McDonald |
| 2004/0158822 A1 | 8/2004 | Sandham et al. |
| 2004/0187123 A1 | 9/2004 | Tremblay et al. |
| 2004/0193857 A1 | 9/2004 | Miller et al. |
| 2004/0205296 A1 | 10/2004 | Bearden |
| 2004/0215886 A1 | 10/2004 | Cargnoni et al. |
| 2004/0216105 A1 | 10/2004 | Burky et al. |
| 2004/0216120 A1 | 10/2004 | Burky et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0044547 A1 | 2/2005 | Gipp |
| 2005/0055504 A1 | 3/2005 | Hass et al. |
| 2005/0060457 A1 | 3/2005 | Olukotun |
| 2005/0066131 A1 | 3/2005 | Biles et al. |
| 2005/0108480 A1 | 5/2005 | Correale, Jr. et al. |
| 2005/0108715 A1 | 5/2005 | Kanai et al. |
| 2005/0114603 A1 | 5/2005 | Buti et al. |
| 2005/0120191 A1 | 6/2005 | Akkary et al. |
| 2005/0120194 A1 | 6/2005 | Kissell |
| 2005/0132145 A1 | 6/2005 | Dybsetter |
| 2005/0154867 A1 | 7/2005 | DeWitt, Jr. et al. |
| 2005/0204118 A1 | 9/2005 | Jen et al. |
| 2005/0216920 A1 | 9/2005 | Tewari et al. |
| 2005/0251639 A1 | 11/2005 | Vishin et al. |

(56) References Cited

U.S. PATENT DOCUMENTS

| | | |
|---|---|---|
| 2005/0251649 A1 | 11/2005 | Yamazaki |
| 2005/0262270 A1 | 11/2005 | Latorre et al. |
| 2005/0289299 A1 | 12/2005 | Nunamaker et al. |
| 2005/0289530 A1 | 12/2005 | Robison |
| 2006/0004964 A1 | 1/2006 | Conti et al. |
| 2006/0026381 A1 | 2/2006 | Doi et al. |
| 2006/0026408 A1 | 2/2006 | Morris et al. |
| 2006/0036516 A1 | 2/2006 | Glebe |
| 2006/0094446 A1 | 5/2006 | Duan |
| 2006/0095720 A1 | 5/2006 | Biles et al. |
| 2006/0143390 A1 | 6/2006 | Kottapalli |
| 2006/0161421 A1 | 7/2006 | Kissell |
| 2006/0161921 A1 | 7/2006 | Kissell |
| 2006/0179257 A1 | 8/2006 | Chu et al. |
| 2006/0179281 A1 | 8/2006 | Jensen |
| 2006/0179289 A1 | 8/2006 | Floyd et al. |
| 2006/0190707 A1 | 8/2006 | McIlvaine et al. |
| 2006/0212687 A1 | 9/2006 | Chen et al. |
| 2006/0230243 A1 | 10/2006 | Cochran et al. |
| 2006/0230253 A1 | 10/2006 | Codrescu et al. |
| 2006/0230409 A1 | 10/2006 | Frigo et al. |
| 2006/0236074 A1 | 10/2006 | Williamson et al. |
| 2006/0236080 A1 | 10/2006 | Doing et al. |
| 2006/0242365 A1 | 10/2006 | Ali et al. |
| 2006/0242384 A1 | 10/2006 | Ahmed et al. |
| 2006/0256641 A1 | 11/2006 | Johnstone |
| 2006/0277365 A1 | 12/2006 | Pong |
| 2006/0282839 A1 | 12/2006 | Hankins et al. |
| 2007/0006231 A1 | 1/2007 | Wang et al. |
| 2007/0074005 A1 | 3/2007 | Abernathy et al. |
| 2007/0198665 A1 | 8/2007 | De et al. |
| 2007/0214343 A1 | 9/2007 | Lindholm et al. |
| 2007/0226722 A1 | 9/2007 | Chou |
| 2007/0262270 A1 | 11/2007 | Huang et al. |
| 2008/0016507 A1 | 1/2008 | Thomas et al. |
| 2008/0040724 A1 | 2/2008 | Kang et al. |
| 2008/0046666 A1 | 2/2008 | Termaine |
| 2008/0052432 A1 | 2/2008 | Wilson et al. |
| 2008/0077813 A1 | 3/2008 | Keller et al. |
| 2008/0091880 A1 | 4/2008 | Vishin |
| 2008/0104598 A1 | 5/2008 | Chang |
| 2008/0109611 A1 | 5/2008 | Liu et al. |
| 2008/0126643 A1* | 5/2008 | Higuchi ................. 710/113 |
| 2008/0126771 A1 | 5/2008 | Chen et al. |
| 2008/0148237 A1 | 6/2008 | Jiang et al. |
| 2008/0184211 A1* | 7/2008 | Nickolls et al. ........ G06F 8/456 717/140 |
| 2008/0195844 A1 | 8/2008 | Shen et al. |
| 2008/0215865 A1 | 9/2008 | Hino et al. |
| 2008/0225987 A1 | 9/2008 | Fazzi et al. |
| 2008/0235500 A1 | 9/2008 | Davis et al. |
| 2008/0250227 A1 | 10/2008 | Linderman et al. |
| 2008/0250232 A1 | 10/2008 | Nakashima |
| 2008/0256278 A1* | 10/2008 | Thomas et al. ............. 710/117 |
| 2008/0256330 A1 | 10/2008 | Wang et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2008/0320476 A1 | 12/2008 | Wingard et al. |
| 2009/0019264 A1 | 1/2009 | Correale, Jr. et al. |
| 2009/0031104 A1 | 1/2009 | Vorbach et al. |
| 2009/0070554 A1 | 3/2009 | Wang et al. |
| 2009/0113170 A1* | 4/2009 | Abdallah ................. 712/17 |
| 2009/0119457 A1 | 5/2009 | Latorre et al. |
| 2009/0138659 A1 | 5/2009 | Lauterbach |
| 2009/0138670 A1 | 5/2009 | Mutlu et al. |
| 2009/0150647 A1 | 6/2009 | Mejdrich et al. |
| 2009/0150890 A1 | 6/2009 | Yourst |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0164766 A1 | 6/2009 | Suggs et al. |
| 2009/0165007 A1 | 6/2009 | Aghajanyan |
| 2009/0172344 A1 | 7/2009 | Grochowski et al. |
| 2009/0240919 A1 | 9/2009 | Alexander et al. |
| 2009/0241084 A1 | 9/2009 | Malley et al. |
| 2009/0249026 A1 | 10/2009 | Smelyanskiy et al. |
| 2009/0251476 A1 | 10/2009 | Jiao et al. |
| 2009/0282101 A1 | 11/2009 | Lim et al. |
| 2009/0287912 A1 | 11/2009 | Sendag |
| 2009/0307450 A1 | 12/2009 | Lee |
| 2009/0328053 A1 | 12/2009 | Dice |
| 2010/0058033 A1 | 3/2010 | Abernathy et al. |
| 2010/0064121 A1 | 3/2010 | Alexander et al. |
| 2010/0082912 A1 | 4/2010 | Lesartre et al. |
| 2010/0088443 A1* | 4/2010 | Riocreux et al. ............. 710/244 |
| 2010/0100690 A1 | 4/2010 | Rajamani et al. |
| 2010/0100704 A1 | 4/2010 | Hill et al. |
| 2010/0100707 A1 | 4/2010 | Mejdrich et al. |
| 2010/0115167 A1* | 5/2010 | Tardieux et al. ............. 710/240 |
| 2010/0115244 A1 | 5/2010 | Jensen et al. |
| 2010/0138607 A1 | 6/2010 | Hughes et al. |
| 2010/0154042 A1 | 6/2010 | Miyamoto et al. |
| 2010/0161948 A1 | 6/2010 | Abdallah |
| 2010/0169578 A1 | 7/2010 | Nychka et al. |
| 2010/0169611 A1 | 7/2010 | Chou et al. |
| 2010/0205603 A1 | 8/2010 | Merten et al. |
| 2010/0211746 A1 | 8/2010 | Tsukishiro |
| 2010/0280996 A1 | 11/2010 | Gross, IV et al. |
| 2010/0286976 A1 | 11/2010 | Gao et al. |
| 2010/0299671 A1 | 11/2010 | Kinsey |
| 2010/0306503 A1 | 12/2010 | Henry et al. |
| 2010/0325394 A1 | 12/2010 | Golla et al. |
| 2011/0010521 A1 | 1/2011 | Wang et al. |
| 2011/0055479 A1 | 3/2011 | West et al. |
| 2011/0067016 A1 | 3/2011 | Mizrachi et al. |
| 2011/0082980 A1 | 4/2011 | Gschwind et al. |
| 2011/0082983 A1 | 4/2011 | Koktan |
| 2011/0093857 A1 | 4/2011 | Sydow et al. |
| 2011/0119660 A1 | 5/2011 | Tanaka |
| 2011/0153955 A1 | 6/2011 | Herrenschmidt et al. |
| 2011/0225588 A1 | 9/2011 | Pollock et al. |
| 2012/0005462 A1 | 1/2012 | Hall et al. |
| 2012/0023318 A1 | 1/2012 | Xing et al. |
| 2012/0042105 A1* | 2/2012 | Maeda ................. G06F 13/364 710/110 |
| 2012/0042126 A1 | 2/2012 | Krick et al. |
| 2012/0066483 A1 | 3/2012 | Boury et al. |
| 2012/0089812 A1 | 4/2012 | Smith |
| 2012/0096204 A1* | 4/2012 | Auerbach et al. ............. 710/244 |
| 2012/0246450 A1 | 9/2012 | Abdallah |
| 2012/0246657 A1 | 9/2012 | Abdallah |
| 2012/0278593 A1 | 11/2012 | Clark et al. |
| 2013/0019047 A1 | 1/2013 | Podvalny et al. |
| 2013/0036296 A1 | 2/2013 | Hickey et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan et al. |
| 2013/0283286 A1 | 10/2013 | Lee et al. |
| 2013/0304991 A1 | 11/2013 | Boettcher et al. |
| 2013/0311759 A1 | 11/2013 | Abdallah |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan |
| 2014/0075168 A1 | 3/2014 | Abdallah |
| 2014/0108730 A1 | 4/2014 | Avudaiyappan et al. |
| 2014/0123145 A1 | 5/2014 | Barrow-Williams et al. |
| 2014/0156947 A1 | 6/2014 | Avudaiyappan |
| 2014/0181833 A1 | 6/2014 | Bird et al. |
| 2014/0281242 A1 | 9/2014 | Abdallah et al. |
| 2014/0281411 A1 | 9/2014 | Abdallah |
| 2014/0281412 A1 | 9/2014 | Abdallah |
| 2014/0281416 A1 | 9/2014 | Abdallah |
| 2014/0281426 A1 | 9/2014 | Abdallah |
| 2014/0281427 A1 | 9/2014 | Abdallah |
| 2014/0281428 A1 | 9/2014 | Abdallah |
| 2014/0281436 A1 | 9/2014 | Abdallah |
| 2014/0282592 A1 | 9/2014 | Abdallah |
| 2014/0282601 A1 | 9/2014 | Abdallah |
| 2014/0317387 A1 | 10/2014 | Abdallah |
| 2014/0344554 A1 | 11/2014 | Abdallah |
| 2014/0373022 A1 | 12/2014 | Chan |

(56) References Cited

U.S. PATENT DOCUMENTS

| | | | |
|---|---|---|---|
| 2015/0039859 | A1 | 2/2015 | Abdallah |
| 2015/0046683 | A1 | 2/2015 | Abdallah |
| 2015/0046686 | A1 | 2/2015 | Abdallah |
| 2015/0186144 | A1 | 7/2015 | Abdallah |
| 2016/0041908 | A1 | 2/2016 | Avudaiyappan |
| 2016/0041913 | A1 | 2/2016 | Avudaiyappan |
| 2016/0041930 | A1 | 2/2016 | Avudaiyappan |
| 2016/0154653 | A1 | 6/2016 | Abdallah |
| 2016/0210145 | A1 | 7/2016 | Abdallah |
| 2016/0210176 | A1 | 7/2016 | Abdallah |
| 2016/0371188 | A1 | 12/2016 | Abdallah |

FOREIGN PATENT DOCUMENTS

| | | |
|---|---|---|
| CN | 1451115 A | 10/2003 |
| CN | 1214666 C | 8/2005 |
| CN | 1713137 A | 12/2005 |
| CN | 1774709 A | 5/2006 |
| CN | 1841314 A | 10/2006 |
| CN | 1841332 A | 10/2006 |
| CN | 1848095 A | 10/2006 |
| CN | 1881223 A | 12/2006 |
| CN | 101114218 A | 1/2008 |
| CN | 101241428 A | 8/2008 |
| CN | 101344840 A | 1/2009 |
| CN | 101449256 A | 6/2009 |
| CN | 101582025 A | 11/2009 |
| CN | 101627365 A | 1/2010 |
| CN | 101916180 A | 12/2010 |
| CN | 102105864 A | 6/2011 |
| EP | 0596636 A2 | 5/1994 |
| EP | 0706133 A2 | 4/1996 |
| EP | 2616928 A2 | 7/2013 |
| GB | 2343270 A | 5/2000 |
| KR | 20010050794 A | 6/2001 |
| KR | 20010053622 | 6/2001 |
| KR | 20100003309 A | 1/2010 |
| TW | 200707284 | 3/1995 |
| TW | 539996 B | 7/2003 |
| TW | 544626 B | 8/2003 |
| TW | 200401187 A | 1/2004 |
| TW | 200405201 A | 4/2004 |
| TW | 591530 B | 6/2004 |
| TW | 200422949 A | 11/2004 |
| TW | I233545 B | 6/2005 |
| TW | I281121 B | 5/2007 |
| TW | 200813766 A | 3/2008 |
| TW | 200844853 A | 11/2008 |
| TW | 200941339 A | 10/2009 |
| TW | I315488 B | 10/2009 |
| TW | 200949690 A | 12/2009 |
| TW | I329437 B | 8/2010 |
| TW | I331282 B | 10/2010 |
| TW | I352288 B | 11/2011 |
| TW | 201227520 A | 7/2012 |
| TW | 201241744 A | 10/2012 |
| TW | 201305819 A | 2/2013 |
| WO | 9750031 A1 | 12/1997 |
| WO | 9919793 A1 | 4/1999 |
| WO | 0125921 A1 | 4/2001 |
| WO | 2004114128 A2 | 12/2004 |
| WO | 2008021434 A1 | 2/2008 |
| WO | WO2008061154 | 5/2008 |
| WO | 2009012296 A2 | 1/2009 |
| WO | 2009101563 A1 | 8/2009 |
| WO | 2010049585 A1 | 5/2010 |
| WO | 2012135031 A2 | 10/2012 |
| WO | 2012135050 A2 | 10/2012 |

OTHER PUBLICATIONS

Alimohammad et al., Modeling of FPGA Local/Global Interconnect Resources and Derivation of Minimal Test Configuration, 2002, IEEE, Proceedings of the 17th IEEE International Symposium on Defect and Fault Tolerance in VLSI Systems, DFT'02, pp. 1-9.
Final Office Action from U.S. Appl. No. 14/213,692, dated Jan. 20, 2016, 18 pages.
Final Office Action from U.S. Appl. No. 14/360,284, dated Mar. 1, 2017, 10 pages.
International Preliminary Report on Patentability for Application No. PCT/US2014/024722, dated Sep. 24, 2015, 6 pages.
International Search Report and Written Opinion for Application No. PCT/US2014/024722, dated Jun. 27, 2014, 7 pages.
Non-final Office Action from U.S. Appl. No. 14/213,692, dated Aug. 24, 2015, 30 pages.
Non-final Office Action from U.S. Appl. No. 14/213,692, dated Jun. 13, 2016, 17 pages.
Notice of Allowance from foreign counterpart Chinese Patent Application No. 200780046679, dated Feb. 6, 2017, 8 pages.
Notice of Allowance from U.S. Appl. No. 14/213,692, dated Dec. 23, 2016, 19 pages.
Abandonment from U.S. Appl. No. 13/824,013, dated Mar. 3, 2015, 1 page.
Communication pursuant to Article 94(3) EPC for European Application No. 12764627, dated Oct. 4, 2016, 4 pages.
Decision to Grant a Patent for Korean Application No. KR1020137027843, dated Apr. 29, 2016, 2 pages.
Extended European Search Report for Application No. EP110826042, dated Jan. 24, 2014, 6 pages.
Extended European Search Report for Application No. EP11876128, dated Jun. 21, 2016, 8 pages.
Extended European Search Report for Application No. EP12764627, dated Jul. 10, 2014, 5 pages.
Final Office Action from U.S. Appl. No. 13/428,440, dated Dec. 24, 2014, 19 pages.
Final Office Action from U.S. Appl. No. 14/212,203, dated Dec. 13, 2016, 20 pages.
Final Office Action from U.S. Appl. No. 14/212,533, dated Jan. 4, 2017, 27 pages.
International Preliminary Report on Patentability for Application No. PCT/US2011/051992, dated Mar. 28, 2013, 8 pages.
International Preliminary Report on Patentability for Application No. PCT/US2011/061953, dated Jun. 5, 2014, 7 pages.
International Preliminary Report on Patentability for Application No. PCT/US2012/30360, dated Oct. 10, 2013, 6 pages.
International Preliminary Report on Patentability for Application No. PCT/US2014/024608, dated Sep. 24, 2015, 8 pages.
International Search Report and Written Opinion for Application No. PCT/US2011/051992, dated Mar. 28, 2012, 11 pages.
International Search Report and Written Opinion for Application No. PCT/US2011/061953, dated Jul. 24, 2012, 8 pages.
International Search Report and Written Opinion for Application No. PCT/US2012/30360, dated Oct. 29, 2012, 7 pages.
International Search Report and Written Opinion for Application No. PCT/US2014/024608, dated Jul. 31, 2014, 9 pages.
Mogul J.C., et al., "Potential benefits of delta encoding and data compression for HTTP,", Oct. 1, 1997, ACM, Sigcomm '97, pp. 181-194.
Nanda A.K., et al., "The Misprediction Recovery Cache," International Journal of Parallel Programming, Plenum Publishing Corporation, 1998, vol. 26 (4), pp. 383-415.
Non-Final Office Action from U.S. Appl. No. 12/296,919, dated Jun. 14, 2010, 7 pages.
Non-Final Office Action from U.S. Appl. No. 13/428,440, dated Jun. 18, 2014, 16 pages.
Non-Final Office Action from U.S. Appl. No. 13/428,440, dated May 4, 2015, 13 pages.
Non-Final Office Action from U.S. Appl. No. 14/212,203, dated Sep. 8, 2016, 52 pages.
Non-Final Office Action from U.S. Appl. No. 14/212,533, dated Sep. 22, 2016, 52 pages.
Non-final Office Action from U.S. Appl. No. 14/360,284, dated Oct. 21, 2016, 32 pages.
Notice of Allowance from U.S. Appl. No. 13/428,440, dated Feb. 26, 2016, 10 pages.

(56) References Cited

OTHER PUBLICATIONS

Notice of Allowance from U.S. Appl. No. 13/428,440, dated Nov. 16, 2016, 9 pages.
Notice of Allowance from U.S. Appl. No. 13/428,440, dated Nov. 20, 2015, 9 pages.
Notification of Reason for Refusal from foreign counterpart Korean Patent Application No. KR1020137027843, dated Sep. 30, 2015, 8 pages.
Rixner et al., "Register Organization for Media Processing," IEEE, 2000.
Sassone et al., "Dynamic Strands: Collapsing Speculative Dependence Chains for Reducing Pipeline Communication," Microarchitecture, IEEE, 37th International Symposium on Portland, USA Dec. 2004, Piscataway, NJ, USA.
Search Report for Chinese Application No. CN201280024012, dated May 19, 2016, 2 pages.
Second Office Action from foreign counterpart China Patent Application No. 201180076244, dated Nov. 18, 2016, 19 pages.
Shiliang Hu., et al., "An Approach for Implementing Efficient Superscalar CISC Processors," High Performance Computer Architecture, 2006, Twelfth International Sumposium on Austin, Texas Feb. 11-15, 2006, pp. 40-51.
Third Office Action from foreign counterpart Chinese Patent Application No. 201280034739, dated Dec. 27, 2016, 18 pages.
Wallace S., et al.,"Multiple Branch and Block Prediction," Third International symposium on High-Performance computer Architecture, IEEE, Feb. 1997, pp. 94-103.
Written Opinion for Application No. PCT/US2007/066536, dated Jul. 30, 2008, 5 pages.
Ye J., et al.,"A New Recovery Mechanism in Superscalar Microprocessors by Recovering Critical Misprediction," IEICE Transactions on Fundamentals of Electronics, Communications and Computer Sciences, 2011, vol. E94-A (12), pp. 2639-2648.
Yeh T., et al.,"Increasing the Instruction Fetch Rate Via Multiple Branch Prediction and a Branch Address Cache," 7th International Conference on Supercomputing, ACM, 1993, pp. 67-76.
Advisory Action from U.S. Appl. No. 12/296,919, dated Aug. 26, 2011, 3 pages.
European Search Report for Application No. 12150513, dated Jun. 19, 2012, 8 pages.
Extended European Search Report for Application No. 07811845.2, dated Nov. 2, 2009, 7 pages.
Extended European Search Report for Application No. 07864410, dated Feb. 19, 2010, 8 pages.
Extended European Search Report for Application No. 12174228, dated Oct. 16, 2012, 4 pages.
Extended European Search Report for Application No. 12174229, dated Oct. 10, 2012, 7 pages.
Extended European Search Report for Application No. 12174229, dated Jul. 4, 2014, 10 pages.
Extended European Search Report for Application No. 12788989, dated May 12, 2016, 8 pages.
Extended European Search Report for Application No. 12789667, dated Feb. 26, 2016, 7 pages.
Notice of Allowance from U.S. Appl. No. 13/691,609, dated Aug. 6, 2014, 11 pages.
Notice of Allowance from U.S. Appl. No. 13/691,609, dated Feb. 23, 2015, 16 pages.
Notice of Allowance from U.S. Appl. No. 14/194,589, dated Jul. 27, 2016, 7 pages.
Notification of Reason for Refusal from foreign counterpart Korean Patent Application No. 20137033565, dated Sep. 30, 2015, 6 pages.
Notification of Reason for Refusal from foreign counterpart Korean Patent Application No. 20137033566, dated Sep. 30, 2015, 9 pages.
Notification to Grant Patent Right for Invention from foreign counterpart China Patent Application No. CN201280034725, dated Aug. 12, 2016, 3 pages.
Notification to Grant Patent Right for Invention from foreign counterpart China Patent Application No. CN201310589048, dated May 5, 2016, 3 pages.

Nuth et al., "The Named-State Register File: Implementation and Performance," High-Performance Computer Architecture, First IEEE Symposium, 1995, 10 pages.
Office Action from foreign counterpart Chinese Patent Application No. 200780046679, dated May 21, 2013, 14 pages.
Restriction Requirement from U.S. Appl. No. 12/296,919, dated Feb. 8, 2011, 4 pages.
Restriction Requirement from U.S. Appl. No. 12/514,303, dated Oct. 15, 2012, 4 pages.
Santos et al., "The 2D-VLIW Architecture", Mar. 2006, (2006), 13 pgs.
Second Office Action from foreign counterpart China Patent Application No. CN201280034725, dated Apr. 14, 2016, 8 pages.
Second Office Action from foreign counterpart China Patent Application No. CN201280034739, dated Jun. 23, 2016, 44 pages.
Summons to attend Oral Proceedings for European Application No. 07864410, dated Apr. 3, 2013, 3 pages.
Communication pursuant to Article 94(3) EPC for European Application No. 07864410, dated Mar. 16, 2012, 4 pages
Communication pursuant to Article 94(3) EPC for European Application No. 07864410, dated Nov. 14, 2012, 4 pages.
Communication pursuant to Article 94(3) EPC for European Application No. 07811845, dated Apr. 16, 2014, 5 pages.
Communication pursuant to Article 94(3) EPC for European Application No. 07811845, dated Dec. 21, 2015, 3 pages.
Communication pursuant to Article 94(3) EPC for European Application No. 07811845, dated Feb. 3, 2014, 5 pages.
Communication pursuant to Article 94(3) EPC for European Application No. 07811845, dated Feb. 16, 2011, 6 pages.
Communication pursuant to Article 94(3) EPC for European Application No. 07811845, dated Jan. 27, 2012, 7 pages.
Communication pursuant to Article 94(3) EPC for European Application No. 12150513, dated Apr. 16, 2013, 5 pages.
Communication pursuant to Article 94(3) EPC for European Application No. 12150513, dated Dec. 21, 2015, 4 pages.
Communication pursuant to Article 94(3) EPC for European Application No. 12150513, dated May 9, 2014, 8 pages.
Communication pursuant to Article 94(3) EPC for European Application No. 12174228, dated Jun. 11, 2013, 3 pages
Decision to Grant a Patent for European Application No. 07811845, dated Jun. 16, 2016, 2 pages.
Decision to Grant a Patent for European Application No. 12150513, dated Jun. 16, 2016, 2 pages.
Decision to Grant a Patent for European Application No. 12174228, dated Dec. 13, 2013, 5 pages.
Decision to Grant a Patent from foreign counterpart Korean Patent Application No. 20137033565, dated Apr. 29, 2016, 2 pages.
Decision to Grant a Patent from foreign counterpart Korean Patent Application No. 20137033566, dated Apr. 29, 2016, 2 pages.
Final Office Action from U.S. Appl. No. 12/296,919, dated Jun. 14, 2011, 7 pages.
Final Office Action from U.S. Appl. No. 12/296,919, dated Oct. 22, 2010, 7 pages.
Final Office Action from U.S. Appl. No. 12/514,303, dated Jan. 24, 2013, 11 pages.
Final Office Action from U.S. Appl. No. 13/475,739, dated Feb. 4, 2015, 12 pages.
Final Office Action from U.S. Appl. No. 13/475,739, dated Nov. 23, 2015, 28 pages.
Final Office Action from U.S. Appl. No. 14/194,589, dated Apr. 19, 2016, 7 pages.
First Office Action from foreign counterpart China Patent Application No. CN201280034725, dated Oct. 26, 2015, 26 pages.
First Office Action from foreign counterpart China Patent Application No. CN201280034739, dated Nov. 3, 2015, 39 pages.
First Office Action from foreign counterpart China Patent Application No. CN201310589048, dated Feb. 2, 2016, 8 pages.
Franklin et al., "The Expandable Split Window Paradigm for Exploiting Fine-Grain Parallelism," ACM Sigarch Computer Architecture News, ACM Special Interest Group on Computer Architecture, vol. 20 (2), 1992, 10 pages.
Intention to Grant a patent for European Application No. 07811845, dated Mar. 31, 2016, 58 pages.

(56) References Cited

OTHER PUBLICATIONS

Intention to Grant a patent for European Application No. 12150513, dated Mar. 15, 2016, 59 pages.
International Preliminary Report on Patentability and for Application No. PCT/US2007/084710, dated May 19, 2009, 4 pages.
International Preliminary Report on Patentability and Written Opinion for Application No. PCT/US2007/066536, dated Oct. 14, 2008, 6 pages.
International Preliminary Report on Patentability and Written Opinion for Application No. PCT/US2012/038711, dated Nov. 20, 2013, 5 pages.
International Preliminary Report on Patentability and Written Opinion for Application No. PCT/US2012/038713, dated Nov. 20, 2013, 5 pages.
International Search Report and Written Opinion for Application No. PCT/US2007/084710, dated May 22, 2008, 6 pages.
International Search Report for Application No. PCT/US2007/066536, dated Jul. 30, 2008, 2 pages.
International Search Report for Application No. PCT/US2012/038711, dated Nov. 28, 2012, 3 pages.
International Search Report for Application No. PCT/US2012/038713, dated Oct. 29, 2012, 3 pages.
Kozyrakis et al., "A New Direction for Computer Architecture Research", IEEE, Nov. 1, 1998, vol. 31 (11), pp. 24-32.
Nagarajan et al., "A Design Space Evaluation of Grid Processor Architectures", 34th ACM/IEEE International Symposium, Piscataway, NJ, Dec. 1-5, 2001, pp. 40-51.
Non-Final Office Action from U.S. Appl. No. 12/296,919, dated Apr. 7, 2011, 8 pages.
Non-Final Office Action from U.S. Appl. No. 12/296,919, dated Mar. 7, 2012, 7 pages.
Non-Final Office Action from U.S. Appl. No. 12/514,303, dated Jun. 27, 2013, 7 pages.
Non-Final Office Action from U.S. Appl. No. 12/514,303, dated May 10, 2012, 9 pages.
Non-Final Office Action from U.S. Appl. No. 13/475,739, dated May 21, 2015, 14 pages.
Non-Final Office Action from U.S. Appl. No. 13/691,609, dated Jan. 15, 2014, 5 pages.
Non-Final Office Action from U.S. Appl. No. 13/691,609, dated Sep. 5, 2013, 11 pages.
Non-Final Office Action from U.S. Appl. No. 14/194,589, dated Nov. 19, 2015, 12 pages.
Notice of Allowance from U.S. Appl. No. 12/296,919, dated Jul. 27, 2012, 6 pages.
Notice of Allowance from U.S. Appl. No. 12/514,303, dated Oct. 25, 2013, 12 pages.
Notice of Allowance from U.S. Appl. No. 13/475,739, dated Aug. 3, 2016, 11 pages.
Notice of Allowance from U.S. Appl. No. 13/475,739, dated Mar. 25, 2016, 25 pages.
International Preliminary Report on Patentability for Application No. PCT/US2014/024276, dated Sep. 24, 2015, 6 pages.
International Preliminary Report on Patentability for Application No. PCT/US2014/024677, dated Sep. 24, 2015, 7 pages.
International Preliminary Report on Patentability for Application No. PCT/US2014/024775, dated Sep. 24, 2015, 6 pages.
International Preliminary Report on Patentability for Application No. PCT/US2014/024828, dated Sep. 24, 2015, 8 pages.
International Search Report and Written Opinion for Application No. PCT/US2011/061940, dated Jul. 20, 2012, 8 pages.
International Search Report and Written Opinion for Application No. PCT/US2011/061957, dated Jul. 20, 2012, 8 pages.
International Search Report and Written Opinion for Application No. PCT/US2012/030383, dated Oct. 25, 2012, 8 pages.
International Search Report and Written Opinion for Application No. PCT/US2012/030409, dated Oct. 12, 2012, 7 pages.
International Search Report and Written Opinion for Application No. PCT/US2014/024276, dated Jul. 31, 2014, 7 pages.
International Search Report and Written Opinion for Application No. PCT/US2014/024677, dated Jun. 30, 2014, 9 pages.
International Search Report and Written Opinion for Application No. PCT/US2014/024775, dated Jun. 2, 2014, 7 pages.
Non-Final Office Action from U.S. Appl. No. 14/214,280, dated Jan. 6, 2017, 14 pages
Non-Final Office Action from from U.S. Appl. No. 14/360,280, dated Feb. 23, 2017, 34 pages.
Notice of Allowance from U.S. Appl. No. 13/428,440, dated Mar. 10, 2017, 52 pages.
Notice of Allowance from U.S. Appl. No. 13/428,452, dated Oct. 21, 2015, 9 pages.
Notice of Allowance from U.S. Appl. No. 14/213,115, dated Jun. 27, 2016.
Notice of Allowance from U.S. Appl. No. 14/213,115, dated Oct. 3, 2016, 20 pages.
Notice of Allowance from U.S. Appl. No. 14/213,135, dated Oct. 17, 2016, 17 pages.
Notice of Allowance from U.S. Appl. No. 14/213,730, dated Oct. 27, 2016, 16 pages.
Notice of Allowance from U.S. Appl. No. 14/213,854, dated Oct. 7, 2016, 19 pages.
Notice of Allowance from U.S. Appl. No. 14/214,045, dated Apr. 18, 2017, 38 pages.
Notice of Allowance from U.S. Appl. No. 14/214,176, dated May 10, 2017, 38 pages.
Notice of Allowance from U.S. Appl. No. 14/215,633, dated Mar. 23, 2017, 17 pages.
Notice of Allowance from U.S. Appl. No. 14/215,633, dated May 23, 2016, 3 pages.
Notice of Allowance from U.S. Appl. No. 14/215,633, dated Sep. 29, 2016, 13 pages.
Notice of Allowance from U.S. Appl. No. 14/216,859, dated Jan. 24, 2017, 17 pages.
Notice of Preliminary Rejection from foreign counterpart Korean Patent Application No. 10-2016-7017150, dated Apr. 20, 2017, 5 pages.
Notification of Reason for Refusal from Foreign Counterpart Korean Patent Application No. 10-2013-7027842, dated Sep. 18, 2015, 7 pages.
Notification of Reason for Refusal from foreign counterpart Korean Patent Application No. 10-2014-7016774, dated Janury 28, 2016, 4 pages.
Notification of Reason for Refusal from foreign counterpart Korean Patent Application No. 20137027841, dated Sep. 18, 2015, 10 pages.
Notification of Reason for Refusal from foreign counterpart Korean Patent Application No. KR1020157029107, dated Oct. 13, 2016, 11 pages.
Notification of Reason for Refusal from Korean Application No. 10-2014-7016763 dated Apr. 29, 2016, 11 pages.
Notification of Reason for Refusal from Korean Application No. 10-2015-7028745 dated May 23, 2016, 8 pages.
Notification to Grant Patent Right for Invention from foreign counterpart China Patent Application No. 201180076245.7, dated Nov. 2, 2016, 3 pages.
Office Action and Search Report from foreign counterpart Taiwan Patent Application No. 101117854, dated Mar. 30, 2017, 7 pages.
Office Action from foreign counterpart Chinese patent application No. 201280024012, dated Feb. 3, 2017, 20 pages.
Office Action from foreign counterpart Chinese patent application No. 201280024095, dated Feb. 4, 2017, 31 pages.
Office Action from foreign counterpart European Patent Application No. EP12764838, dated Oct. 4, 2016, 4 pages.
Office Action from foreign counterpart Taiwan Patent Application No. 20140109479, dated Nov. 28, 2016, 7 pages.
Partial Supplementary European Search Report for Application No. EP14770976.0, dated Mar. 24, 2017, 7 pages.
Partial SupplementaryEuropean Search Report for Application No. 14769450.9, dated Oct. 11, 2016, 8 pages.
Restriction Requirement from U.S. Appl. No. 14/360,282, dated Jul. 28, 2016, 4 pages.

(56) References Cited

OTHER PUBLICATIONS

Rotenberg E., et al., "Trace Cache: a Low Latency Approach to High Bandwidth Instruction Fetching," Apr. 11, 1996, 48 pages.
Second Office Action from foreign counterpart China Patent Application No. 201180076248.0, dated Oct. 20, 2016, 25 pages.
Second Office Action from foreign counterpart Chinese Patent Application No. 201280024054.0, dated Dec. 26, 2016, 11 pages.
Third Office Action and Search report from foreign counterpart China Patent Application No. 201180076248.0, dated May 2, 2017, 27 pages.
Third Office Action from foreign counterpart Chinese Patent Application No. 201180076244.2, dated May 2, 2017, 20 pages.
Advisory Action from U.S. Appl. No. 14/214,280, dated May 15, 2017, 3 pages.
Barham P., et al., "Xen and the Art of Virtualization," Proceedings of the ACM Symposium on Operating Systems Principles, XP002298786, Oct. 2003, pp. 164-177.
Communication pursuant to Rules 161(2) and 162 EPC for Application No. 12763717, dated Nov. 22, 2013, 3 pages.
Communication pursuant to Rules 70(2) and 70a(2) EPC for Application No. 12763717, dated Oct. 10, 2014, 1 page.
Communication pursuant to Rules 70(2) and 70a(2) EPC for European Application No. 11876314.3, dated Jul. 1, 2016, 1 page.
Cooperman G.,"Cache Basics," 2003, pp. 1-3, URL: http://www.ccs.neu.edu/course/com3200/parent/NOTES/cache-basics.html.
Decision to Grant a Patent for Korean Patent Application No. 20137027842, dated Mar. 31, 2016, 2 pages.
Decision to grant a patent from foreign counterpart Korean Patent Application No. 10-2014-7016774, dated Jul. 25, 2016, 2 pages.
Decision to Grant a Patent from foreign counterpart Korean Patent Application No. KR1020157029107, dated Apr. 25, 2017, 2 pages.
Examination Report for European Application No. 12763717, dated Nov. 28, 2016, 5 pages.
Extended European Search Report for Application No. 11876314.3, dated Jun. 14, 2016, 6 pages.
Extended European Search Report for Application No. 14769411.1, dated Apr. 5, 2017, 8 pages.
Extended European Search Report for Application No. 14769450.9, dated Feb. 21, 2017, 16 pages.
Extended European Search Report for Application No. 16196777.3, dated Mar. 20, 2017, 6 pages.
Extended European Search Report for Application No. EP11876130, dated Jun. 1, 2016, 7 pages.
Extended European Search Report for Application No. EP12763717, dated Sep. 24, 2014, 5 pages.
Extended European Search Report for Application No. EP12764838, dated Jul. 10, 2014.
Final Office Action from U.S. Appl. No. 13/428,438, dated Dec. 24, 2014, 17 pages.
Final Office Action from U.S. Appl. No. 13/428,452, dated Dec. 24, 2014, 20 pages.
Final Office Action from U.S. Appl. No. 14/213,115, dated Feb. 3, 2015, 11 pages.
Final Office Action from U.S. Appl. No. 14/213,115, dated Mar. 7, 2016, 18 pages.
Final Office Action from U.S. Appl. No. 14/213,135, dated Oct. 26, 2015, 20 pages.
Final Office Action from U.S. Appl. No. 14/213,218, dated Jul. 6, 2016, 24 pages.
Final Office Action from U.S. Appl. No. 14/213,218, dated Jul. 22, 2015, 16 pages.
Final Office Action from U.S. Appl. No. 14/213,730, dated May 11, 2016, 14 pages.
Final Office Action from U.S. Appl. No. 14/213,854, dated Nov. 9, 2015, 19 pages.
Final Office Action from U.S. Appl. No. 14/214,045, dated Aug. 29, 2016, 14 pages.
Final Office Action from U.S. Appl. No. 14/214,176, dated Aug. 29, 2016, 17 pages.
Final Office Action from U.S. Appl. No. 14/214,280, dated Mar. 6, 2017, 12 pages.
Final Office Action from U.S. Appl. No. 14/214,280, dated Mar. 11, 2016, 18 pages.
Final Office Action from U.S. Appl. No. 14/214,280, dated Oct. 24, 2016, 20 pages.
Final Office Action from U.S. Appl. No. 14/216,493, dated Aug. 30, 2016, 21 pages.
Final Office Action from U.S. Appl. No. 14/216,493, dated May 22, 2017, 17 pages.
Final Office Action from U.S. Appl. No. 14/216,859, dated Jun. 9, 2016, 16 pages.
Final Office Action from U.S. Appl. No. 14/360,282, dated Feb. 16, 2017, 10 pages.
First Office Action and Search report from foreign counterpart China Patent Application No. 201180076248.0, dated Mar. 17, 2016, 25 pages.
First Office Action and Search Report from foreign counterpart China Patent Application No. 201480024463.X, dated Apr. 1, 2017, 31 pages. (Translation available only for office action).
First Office Action and Search report from foreign counterpart Chinese Patent Application No. 201180076244.2, dated Mar. 22, 2016, 18 pages (Translation available only for Office Action).
First Office Action from foreign counterpart China Patent Application No. 201180076245.7, dated Mar. 21, 2016, 10 pages.
First Office Action from foreign counterpart China Patent Application No. 201280024012.7, dated May 30, 2016, 21 pages.
First Office Action from foreign counterpart Chinese Patent Application No. 201280024054.0, dated May 30, 2016, 24 pages.
First Office Action from foreign counterpart Chinese patent application No. 201280024095, dated May 26, 2016, 32 pages.
Garmany J., "The Power of Indexing," archieved on Mar. 9, 2009, 7 pages.
Grant of Patent for Korean Application No. 10-2014-7016763, dated Oct. 31, 2016, 2 pages.
Grant of Patent for Korean Application No. 10-2015-7028745, dated Nov. 30, 2016, 2 pages.
International Preliminary Report on Patentability for Application No. PCT/US2011/061940, dated Jun. 5, 2014, 6 pages.
International Preliminary Report on Patentability for Application No. PCT/US2011/061957, dated Jun. 5, 2014, 7 pages.
International Preliminary Report on Patentability for Application No. PCT/US2012/030383, dated Oct. 10, 2013, 6 pages.
International Preliminary Report on Patentability for Application No. PCT/US2012/030409, dated Oct. 10, 2013, 6 pages.
Non-Final Office Action from U.S. Appl. No. 15/219,063, dated May 30, 2017, 102 pages.
Notice of Allowance from U.S. Appl. No. 14/213,218, dated Jun. 16, 2017, 89 pages.
Notice of Allowance from U.S. Appl. No. 14/360,284, dated Jun. 14, 2017, 100 pages.
Notification of Reason for Refusal from foreign counterpart Korean Patent Application No. 10-2017-7002473, dated May 26, 2017, 7 pages.
International Search Report and Written Opinion for Application No. PCT/US2014/024828, dated Jul. 28, 2014, 9 pages.
Jacobson et al., "Path-based Next Trace Prediction," IEEE, 1997, pp. 14-23.
Non-Final Office Action from U.S. Appl. No. 14/733,827, dated Apr. 28, 2017, 99 pages.
Non-Final Office Action from U.S. Appl. No. 13/428,438, dated Apr. 24, 2014, 15 pages.
Non-Final Office Action from U.S. Appl. No. 13/428,438, dated May 1, 2015, 12 pages.
Non-Final Office Action from U.S. Appl. No. 13/428,452, dated Apr. 23, 2015, 11 pages.
Non-Final Office Action from U.S. Appl. No. 13/428,452, dated Apr. 28, 2014, 21 pages.
Non-Final Office Action from U.S. Appl. No. 14/212,203, dated Mar. 24, 2017, 68 pages.
Non-Final Office Action from U.S. Appl. No. 14/212,533, dated Apr. 20, 2017, 116 pages.

(56) References Cited

OTHER PUBLICATIONS

Non-Final Office Action from U.S. Appl. No. 14/213,115, dated Oct. 19, 2015, 24 pages.
Non-Final Office Action from U.S. Appl. No. 14/213,115, dated Sep. 22, 2014, 19 pages.
Non-Final Office Action from U.S. Appl. No. 14/213,135, dated May 14, 2015, 23 pages.
Non-Final Office Action from U.S. Appl. No. 14/213,135, dated May 31, 2016, 14 pages.
Non-Final Office Action from U.S. Appl. No. 14/213,218, dated Apr. 22, 2015, 22 pages.
Non-Final Office Action from U.S. Appl. No. 14/213,218, dated Feb. 2, 2016, 17 pages.
Non-Final Office Action from U.S. Appl. No. 14/213,730, dated Jan. 7, 2016, 27 pages.
Non-Final Office Action from U.S. Appl. No. 14/213,854, dated Apr. 29, 2016, 13 pages.
Non-Final Office Action from U.S. Appl. No. 14/213,854, dated Jun. 19, 2015, 23 pages.
Non-Final Office Action from U.S. Appl. No. 14/214,045, dated Apr. 1, 2016, 61 pages.
Non-Final Office Action from U.S. Appl. No. 14/214,045, dated Dec. 19, 2016, 88 pages.
Non-Final Office Action from U.S. Appl. No. 14/214,176, dated Jan. 6, 2017, 36 pages.
Non-Final Office Action from U.S. Appl. No. 14/214,176, dated Mar. 25, 2016, 25 pages.
Non-Final Office Action from U.S. Appl. No. 14/214,280, dated Jan. 6, 2017, 14 pages.
Non-Final Office Action from U.S. Appl. No. 14/214,280, dated Jun. 16, 2016, 12 pages.
Non-Final Office Action from U.S. Appl. No. 14/214,280, dated Sep. 18, 2015, 18 pages.
Non-Final Office Action from U.S. Appl. No. 14/215,633, dated Oct. 22, 2015, 18 pages.
Non-final Office Action from U.S. Appl. No. 14/216,493, dated Apr. 4, 2016, 26 pages.
Non-Final Office Action from U.S. Appl. No. 14/216,493, dated Mar. 29, 2017, 18 pages.
Non-Final Office Action from U.S. Appl. No. 14/216,859, dated Jan. 28, 2016, 33 pages.
Non-Final Office Action from U.S. Appl. No. 14/360,280, dated Feb. 23, 2017, 34 pages.
Non-Final Office Action from U.S. Appl. No. 14/360,282, dated Oct. 21, 2016, 13 pages.
Non-final Office Action from U.S. Appl. No. 15/257,593, dated Apr. 7, 2017, 37 pages.
Notice of Allowance from foreign counterpart Korean Patent Application No. 20137027841, dated Mar. 31, 2016, 2 pages.
Notice of Allowance from U.S. Appl. No. 13/428,438, dated Apr. 13, 2017, 52 pages.
Notice of Allowance from U.S. Appl. No. 13/428,438, dated Aug. 10, 2016, 9 pages.
Notice of Allowance from U.S. Appl. No. 13/428,438, dated Dec. 29, 2016, 9 pages.
Notice of Allowance from U.S. Appl. No. 13/428,438, dated Mar. 4, 2016, 14 pages.
Notice of Allowance from U.S. Appl. No. 13/428,438, dated Nov. 6, 2015, 9 pages.
Notice of Allowance from U.S. Appl. No. 13/428,440, dated Apr. 20, 2017, 16 pages.
Final Office Action from U.S. Appl. No. 14/360,282, dated Oct. 4, 2017, 22 pages.
Final Office Action from U.S. Appl. No. 15/219,063, dated Nov. 20, 2017, 27 pages.
Notice of Allowance from foreign counterpart Korean Patent Application No. 10-2016-7017150, dated Oct. 30, 2017, 3 pages.
Notice of Allowance from U.S. Appl. No. 14/213,692, dated Sep. 28, 2017, 112 pages.
Notice of Allowance from U.S. Appl. No. 14/214,045, dated Oct. 6, 2017, 137 pages.
Notice of Allowance from U.S. Appl. No. 14/214,176, dated Oct. 19, 2017, 25 pages.
Notice of Allowance from U.S. Appl. No. 14/215,633, dated Oct. 4, 2017, 15 pages.
Notice of Allowance from U.S. Appl. No. 14/733,827, dated Sep. 22, 2017, 30 pages.
Notice of Allowance from U.S. Appl. No. 15/257,593, dated Oct. 11, 2017, 95 pages.
Notice on Grant of Patent Right for Invention from foreign counterpart Chinese Patent Application No. 201280024095.X, dated Nov. 7, 2017, 6 pages.
Third Office Action from foreign counterpart Chinese Patent Application No. 201280024012.7, dated Nov. 6, 2017, 8 pages.
Communication pursuant to Article 94(3) EPC for European Application No. 12788989.7, dated Jun. 22, 2017, 6 pages.
Extended European Search Report for Application No. 14770976.0, dated Jul. 3, 2017, 9 pages.
Final Office Action from U.S. Appl. No. 14/360,280, dated Aug. 10, 2017, 103 pages.
Intel "Programming on Intel® Platform," The edition team of Intel® Software College course book, Shanghai Jiao Tong University Press, published Jan. 31, 2011, pp. 175-180.
Non-Final Office Action from U.S. Appl. No. 14/360,282, dated Jun. 22, 2017, 97 pages.
Non-Final Office Action from U.S. Appl. No. 15/082,359, dated Aug. 11, 2017, 108 pages.
Non-final Office Action from U.S. Appl. No. 15/354,742, dated Aug. 25, 2017, 152 pages.
Non-final Office Action from U.S. Appl. No. 15/357,943, dated Aug. 25, 2017, 111 pages.
Notice of Allowance from U.S. Appl. No. 13/428,438, dated Aug. 7, 2017, 42 pages.
Notice of Allowance from U.S. Appl. No. 14/213,135, dated Aug. 3, 2017, 103 pages.
Notice of Allowance from U.S. Appl. No. 14/214,280, dated Jun. 29, 2017, 86 pages.
Notice of Allowance from U.S. Appl. No. 14/215,633, dated Jun. 30, 2017, 83 pages.
Notice of Allowance from U.S. Appl. No. 14/216,493, dated Aug. 4, 2017, 95 pages.
Notice of Allowance from U.S. Appl. No. 15/019,920, dated Jul. 14, 2017, 100 pages.
Notice of Allowance from U.S. Appl. No. 15/082,867, dated Jul. 7, 2017, 98 pages.
Notice of Final Rejection from foreign counterpart Korean Patent Application No. 10-2015-7029262, dated May 23, 2017, 7 pages.
Notification of Reason for Refusal from foreign counterpart Korean Patent Application No. 10-2015-7029262, dated Oct. 17, 2016, 12 pages.
Notification of Reason for Refusal from foreign counterpart Korean Patent Application No. 10-2017-7002379, dated May 26, 2017, 6 pages.
Final Office Action from U.S. Appl. No. 14/212,203, dated Sep. 12, 2017, 84 pages.
Final Office Action from U.S. Appl. No. 14/212,533, dated Sep. 8, 2017, 69 pages.
Non-Final Office Action from U.S. Appl. No. 15/354,857, dated Sep. 12, 2017, 111 pages.
Notice of Allowance from foreign counterpart Korean Patent Application No. 10-2015-7029262, dated Aug. 31, 2017, 3 pages.
Notice of Allowance from U.S. Appl. No. 14/213,730, dated Aug. 31, 2017, 96 pages.
Notice on Grant of Patent Right for Invention from foreign counterpart China Application No. 201180076244.2, dated Aug. 28, 2017, 4 pages.
Office Action and Search Report from foreign counterpart Taiwan Patent Application No. 100142885, dated Jan. 23, 2017, 12 pages.
Third Office Action from foreign counterpart China Patent Application No. 201280024054.0, dated Jul. 28, 2017, 8 pages.
Advisory Action from U.S. Appl. No. 14/360,282, dated Jan. 23, 2018, 2 pages.

(56) References Cited

OTHER PUBLICATIONS

Final Office Action from U.S. Appl. No. 15/082,359, dated Jan. 31, 2018, 22 pages.
Final Office Action from U.S. Appl. No. 15/354,742, dated Nov. 29, 2017, 20 pages.
Final Office Action from U.S. Appl. No. 15/354,857, dated Nov. 28, 2017, 23 pages
Fourth Office Action and Search report from foreign counterpart China Patent Application No. 201180076248.0, dated Nov. 9, 2017, 38 pages. (Translation available only for office action).
Non-Final Office Action from U.S. Appl. No. 13/824,013, dated Feb. 7, 2018, 141 pages.
Non-Final Office Action from U.S. Appl. No. 14/360,280, dated Dec. 14, 2017, 25 pages.
Notice of Allowance and Search Report from foreign counterpart Taiwan Patent Application No. 103109479, dated Nov. 30, 2017, 4 pages. (Translation available only for Search report).
Notice of Allowance from foreign counterpart Korean Patent Application No. 10-2017-7002379, dated Dec. 20, 2017, 3 pages.
Notice of Allowance from foreign counterpart Korean Patent Application No. 10-2017-7002473, dated Dec. 20, 2017, 6 pages.
Notice of Allowance from U.S. Appl. No. 14/216,859, dated Dec. 1, 2017, 113 pages.
Notice of Allowance from U.S. Appl. No. 15/019,920, dated Dec. 6, 2017, 24 pages.
Notice of Allowance from U.S. Appl. No. 15/082,867, dated Dec. 22, 2017, 25 pages.
Notice of Allowance from U.S. Appl. No. 15/357,943, dated Jan. 16, 2018, 16 pages.
Notice on Grant of Patent Right for Invention from foreign counterpart Chinese Patent Application No. 201280024054.0, dated Dec. 1, 2017, 4 pages.
Second Office Action from foreign counterpart China Patent Application No. 201480024463.X, dated Nov. 14, 2017, 34 pages.
First Office Action and Search Report from foreign counterpart Chinese Patent Application No. 201480024528.0, dated Jan. 26, 2018, 19 pages.

\* cited by examiner

|  | Segment 1 | Segment 2 | Segment 3 |
|---|---|---|---|
| Request 1 | 1 | 1 | 0 |
| Request 2 | 0 | 0 | 1 |
| Request 3 | 0 | 1 | 0 |
| Request 4 | 0 | 1 | 1 |
| Request 5 | 1 | 1 | 0 |
| Request 6 (cancelled) | 1 | 1 (exceed limit) | 0 |
| Request 7 (cancelled) | 1 | 1 (exceed limit) | 1 |
| Request 8 | 0 | 0 | 1 |

FIG. 7

| | 1-3 | 3-1 | 4-1 | 1-4 | 2-4 | 4-2 |
|---|---|---|---|---|---|---|
| Request 1 | 0 | 1 | 0 | 0 | 0 | 0 |
| Request 2 | 0 | 0 | 1 | 0 | 0 | 1 |
| Request 3 | 0 | 0 | 0 | 0 | 1 | 0 |
| Request 4 (cancelled) | 0 | 0 | 0 | 0 | 1 (exceed limit) | 0 |
| Request 5 | 1 | 0 | 0 | 1 | 0 | 0 |
| Request 6 (cancelled) | 0 | 1 (exceed limit) | 0 | 0 | 0 | 0 |
| Request 7 (cancelled) | 1 (exceed limit) | 1 (exceed limit) | 0 | 0 | 0 | 0 |
| Request 8 | 0 | 0 | 0 | 0 | 0 | 0 |

Only one pair uses of the bus, point to point

Requests come from multiple orchestrators that want to route through the point to point busses

FIG. 8

DECENTRALIZED ALLOCATION OF RESOURCES AND INTERCONNECT STRUCTURES TO SUPPORT THE EXECUTION OF INSTRUCTION SEQUENCES BY A PLURALITY OF ENGINES

This application claims the benefit commonly assigned U.S. Provisional Patent Application Ser. No. 61/488,662, titled "DECENTRALIZED ALLOCATION OF RESOURCES AND INTERCONNNECT STRUCTURES TO SUPPORT THE EXECUTION OF INSTRUCTION SEQUENCES BY A PLURALITY OF ENGINES" by Mohammad A. Abdallah, filed on May 20, 2011, and which is incorporated herein in its entirety.

CROSS REFERENCE TO RELATED APPLICATION

This application is related to co-pending commonly assigned U.S. patent application Ser. No. 12/514,303, titled "APPARATUS AND METHOD FOR PROCESSING COMPLEX INSTRUCTION FORMATS IN A MULTI-THREADED ARCHITECTURE SUPPORTING VARIOUS CONTEXT SWITCH MODES AND VIRTUALIZATION SCHEMES" by Mohammad A. Abdallah, filed on Jan. 5, 2010, and which is incorporated herein in its entirety.

This application is related to co-pending commonly assigned U.S. patent application Ser. No. 12/296,919, titled "APPARATUS AND METHOD FOR PROCESSING AN INSTRUCTION MATRIX SPECIFYING PARALLEL IN DEPENDENT OPERATIONS" by Mohammad A. Abdallah, filed on Dec. 19, 2008, and which is incorporated herein in its entirety.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using state of the art compiler or user parallelization techniques for non-explicitly/easily parallelized/threaded software codes.

SUMMARY OF THE INVENTION

In one embodiment the present invention is implemented as a method for decentralized resource allocation in an integrated circuit (e.g., microprocessor, etc.). The method includes receiving a plurality of requests from a plurality of resource consumers of a plurality of partitionable engines to access a plurality resources, wherein the resources are spread across the plurality of engines and are accessed via a global interconnect structure. At each resource, a number of requests for access to said each resource are added. At said each resource, the number of requests are compared against a threshold limiter. At said each resource, a subsequent request that is received that exceeds the threshold limiter is canceled. Subsequently, requests that are not canceled within a current clock cycle are implemented.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 7 shows a table that illustrates the manner which requests for segments of the interconnect are contested for and allocated in accordance with one embodiment of the present invention.

FIG. 8 shows a table that illustrates the manner in which requests for a point-to-point bus are handled in accordance with one embodiment of the present invention.

DETAILED DESCRIPTION OF THE INVENTION

Figure 1A:
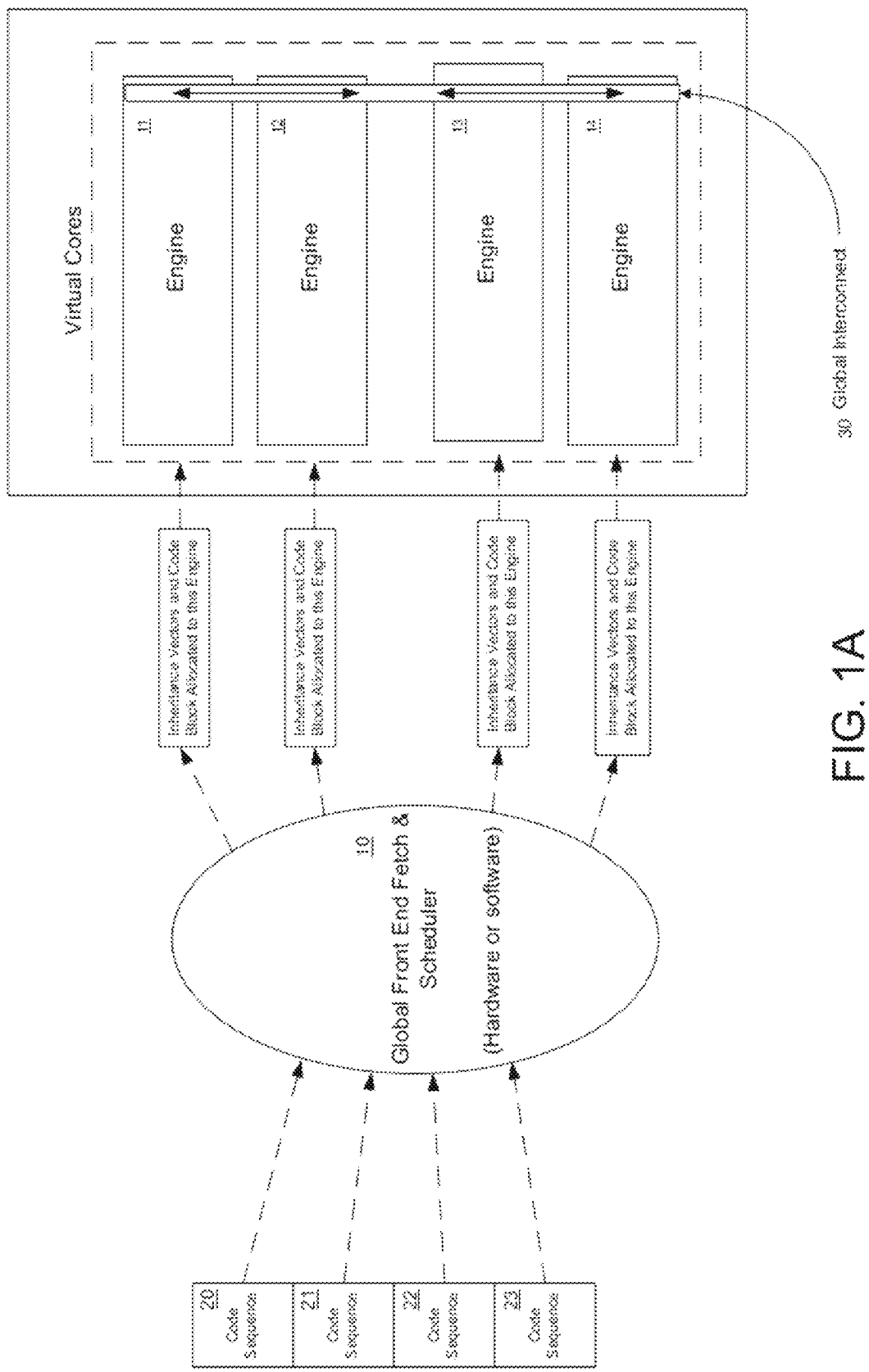
FIG. 1A shows an overview of the manner in which the global front end generates code blocks and inheritance vectors to support the execution of code sequences on their respective engines.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention utilize a front end scheduler, a plurality of segmented register files or a single register file, and a memory subsystem to implement fragmented address spaces for multiple cores of a multicore processor. In one embodiment, fragmentation enables the scaling of microprocessor performance by allowing additional virtual cores (e.g., soft cores) to cooperatively execute instruction sequences comprising one or more threads. The fragmentation hierarchy is the same across each cache hierarchy (e.g., L1 cache, L2 cache). The fragmentation hierarchy divides the address space into fragments using address bits, where the address bits are used such that the fragments are identified by bits that are above cache line boundaries and below page boundaries. Each fragment is configured to utilize a multiport bank structure for storage. Embodiments of the present invention are further described in the FIGS. 1A and 1B below.

FIG. 1A shows an overview diagram of a processor in accordance with one embodiment of the present invention. As depicted in FIG. 1A, the processor includes a global front end fetch and scheduler 10 and a plurality of partitionable engines 11-14.

FIG. 1A shows an overview of the manner in which the global front end generates code blocks and inheritance vectors to support the execution of code sequences on their respective partitionable engines. Each of the code sequences 20-23 can belong to the same logical core/thread or to different logical cores/threads, depending upon the particular virtual core execution mode. The global front end fetch and scheduler will process the code sequences 20-23 to generate code blocks and inheritance vectors. These code blocks and inheritance vectors are allocated to the particular partitionable engines 11-14 as shown.

The engines implement virtual cores, in accordance with a selected mode. An engine includes a segment, a fragment and a number of execution units. The resources within the engines can be used to implement virtual cores that have multiple modes. As provisioned by the virtual core mode, one soft core, or many soft cores, can be implemented to support one logical core/thread. In the FIG. 1A embodiment, depending on the selected mode, the virtual cores can support one logical core/thread or four logical cores/threads. In an embodiment where the virtual cores support four logical cores/threads, the resources of each virtual core are spread across each of the partitionable engines. In an embodiment where the virtual cores support one logical core/thread, the resources of all the engines are dedicated to that core/thread. The engines are partitioned such that each engine provides a subset of the resources that comprise each virtual core. In other words, a virtual core will comprise a subset of the resources of each of the engines 11-14. Communication between the resources of each of the engines 11-14 is provided by a global interconnection structure 30 in order to facilitate this process. Alternatively, the engines 11-14 can be used to implement a physical mode where the resources of the engines 11-14 are dedicated to support the execution of a dedicated core/thread. In this manner, the soft cores implemented by the engines comprise virtual cores that have resources spread across each of the engines. The virtual core execution modes are further described in the figures below.

It should be noted that in a conventional core implementation, the resources within one core/engine are solely allocated to one logical thread/core. In contrast, in embodiments of the present invention, the resources of any engine/core can be partitioned, collectively with other engine/core partitions, to instantiate a virtual core that is allocated to one logical thread/core. Embodiments of the present invention can also implement multiple virtual execution modes in which those same engines can be partitioned to support many dedicated cores/threads or many dynamically allocated cores/threads, as well as configurations in which where all of the resources of all engines support the execution of a single core/thread. Some representative embodiments are further described below. In other embodiments of the current invention, the techniques of the current invention can be applied directly to a conventional multi-core implementation to enable efficient contestation, reservation and allocation of multi-core shared resources and interconnects. Similarly the current invention can be applied within a single core or compute engine to enable efficient contestation, reservation and allocation of any shared resources or interconnects within the core (i.e., ports, busses, execution units, caches, structures), For example, the embodiments shown in FIG. 1A, FIG. 1B and FIG. 5 could be replaced by a typical multi-core design that has no global front-end or inheritance vectors, but rather has engines that instantiate multiple cores or multiple threads having access to resources such as caches, shared interconnects (e.g., meshes or grids), or shared multi-directional busses. In such embodiments, the current invention can still be directly applied to allow efficient resource and interconnect contestation, reservation and allocation. Similarly, embodiments of the current invention can be applied to each core or engine in order to contend, reserve and allocate resources or interconnects.

Figure 1B:
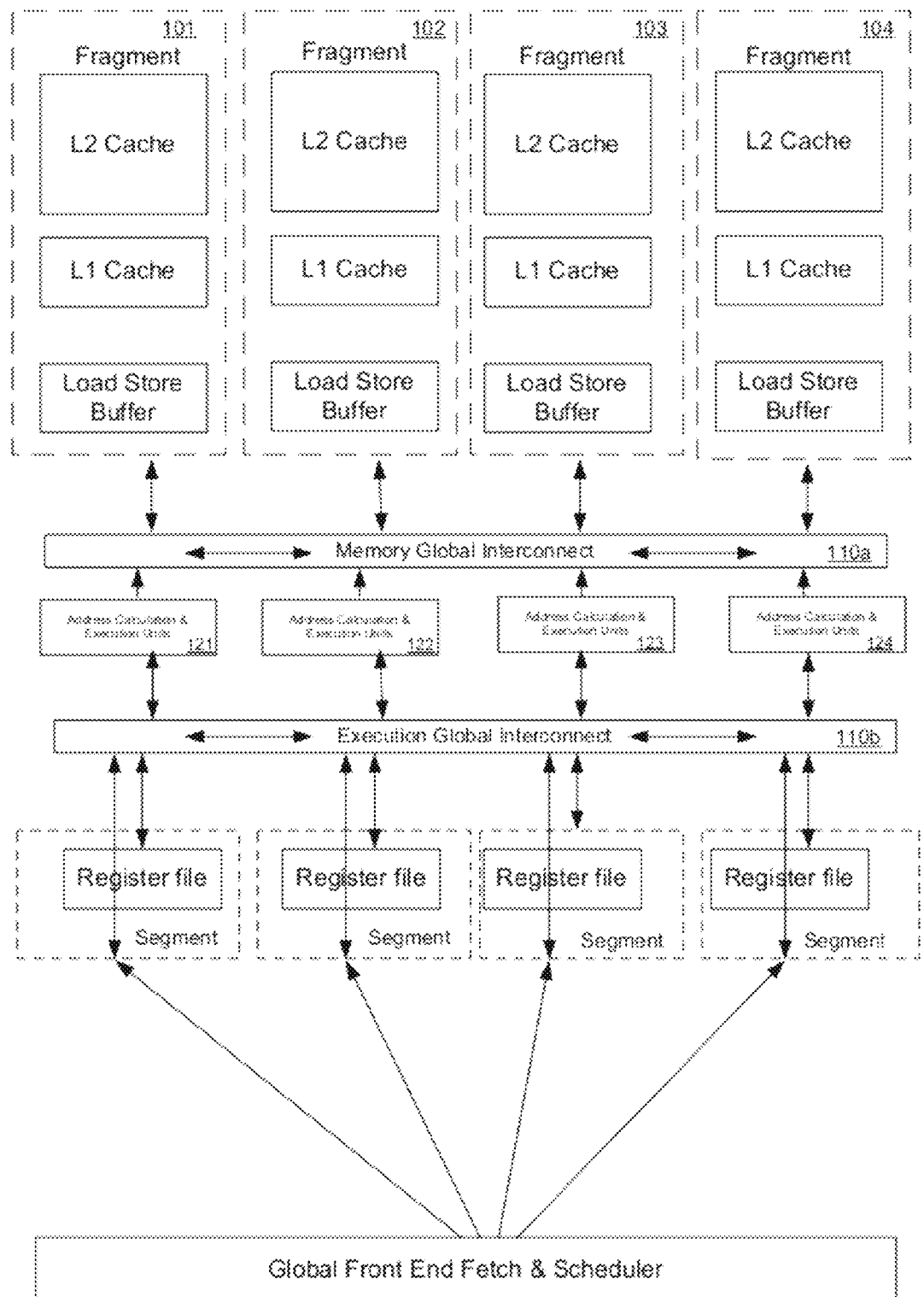
FIG. 1B shows an overview diagram of engines and their components, including segmented scheduler and register files, interconnects and a fragmented memory subsystem for a multicore processor in accordance with one embodiment of the present invention.

FIG. 1B shows an overview diagram of partitionable engines and their components, including segmented scheduler and register files, global interconnects and a fragmented memory subsystem for a multicore processor in accordance with one embodiment of the present invention. As depicted in FIG. 1, four fragments 101-104 are shown. The fragmentation hierarchy is the same across each cache hierarchy (e.g., L1 cache, L2 cache, and the load store buffer). Data can be exchanged between each of the L1 caches, each of the L2 caches and each of the load store buffers through the memory global interconnect 110a.

The memory global interconnect comprises a routing matrix that allows a plurality of cores (e.g., the address calculation and execution units 121-124) to access data that may be stored at any point in the fragmented cache hierarchy (e.g., L1 cache, load store buffer and L2 cache). FIG. 1 also depicts the manner whereby each of the fragments 101-104 can be accessed by address calculation and execution units 121-124 through the memory global interconnect 110a.

The execution global interconnect 110b similarly comprises a routing matrix allows the plurality of cores (e.g., the address calculation and execution units 121-124) to access data that may be stored at any of the segmented register files. Thus, the cores have access to data stored in any of the fragments and data stored in any of the segments through the memory global interconnect 110a or the execution global interconnect 110b.

FIG. 1B further shows a global front end fetch & scheduler 150 which has a view of the entire machine and which manages the utilization of the register files segments and the fragmented memory subsystem. Address generation comprises the basis for fragment definition. The global front end Fetch & scheduler functions by allocating instruction sequences to each segment's partition scheduler. The common partition scheduler then dispatches those instruction sequences for execution on the address calculation and execution units 121-124.

Additionally, it should be noted that the partitionable engines shown in FIG. 1A can be nested in a hierarchal way. In such an embodiment, a first level partitionable engine would include a local front end fetch and scheduler and multiple secondary partitionable engines connected to it.

Figure 2:
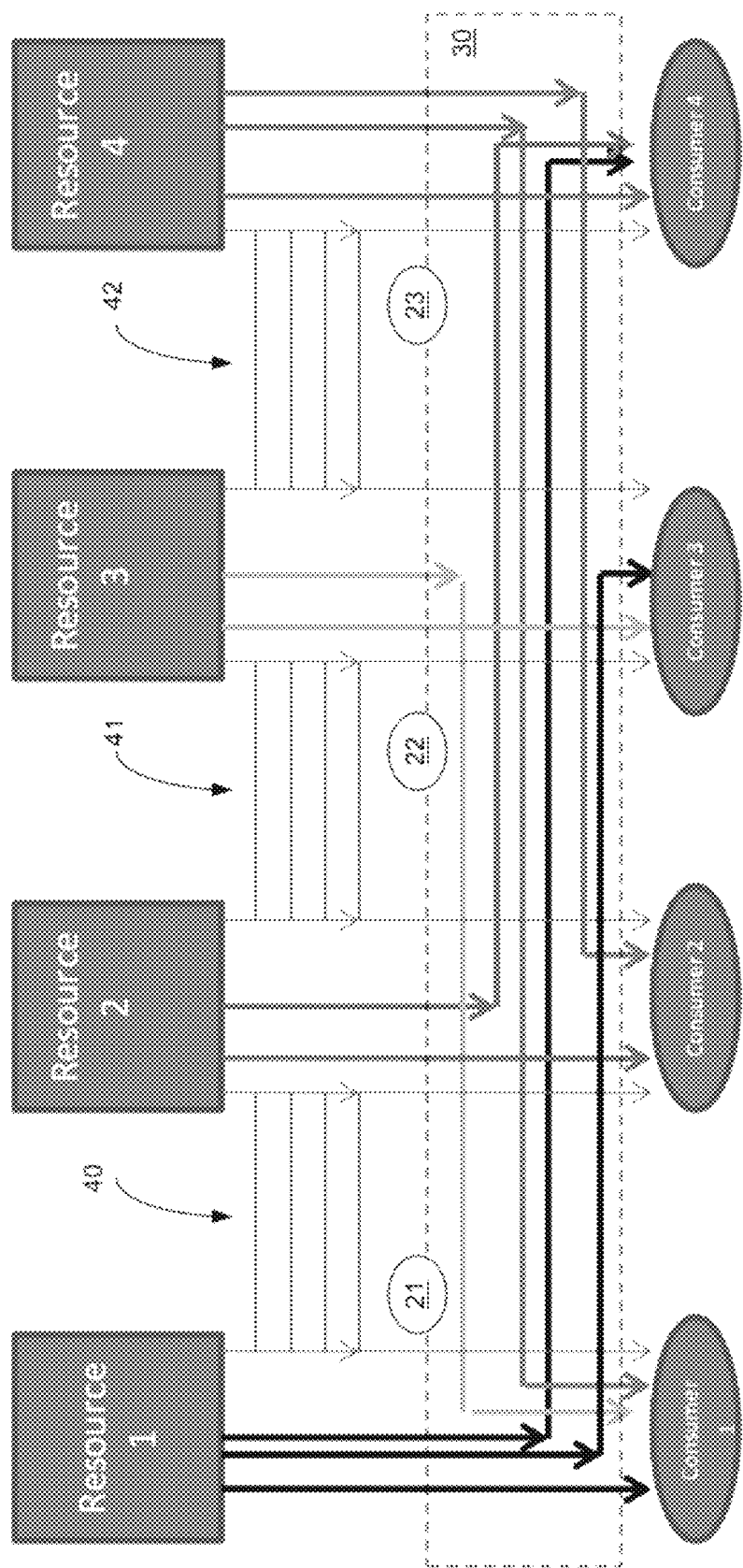
FIG. 2 shows an overview diagram depicting additional features of the interconnect described in the discussion of FIGS. 1A and 1B, and a plurality of local interconnects in accordance with one embodiment of the present invention.

FIG. 2 shows an overview diagram depicting additional features of the interconnect 30 described above in the discussion of FIGS. 1A and 1B, and a plurality of local interconnects 40-42 in accordance with one embodiment of the present invention. The FIG. 2 structure illustrates an orchestrating model of an interconnect structure. FIG. 2 shows a plurality of resources connected to a corresponding plurality of consumers. The resources are the data storage resources of each of the partitionable engines (e.g., register files, load store buffers, L1 cache and L2 cache). The consumers are the execution units and address calculation units of each of the partitionable engines. FIG. 2 further shows a plurality of orchestrators 21-23.

As described above, communication between the resources of each of the engines 11-14 is provided by an interconnection structure. By way of example, in the FIG. 2 embodiment, the interconnect structure 30 is a dedicated point-to-point bus. In the FIG. 2 embodiment, there are six buses which span across the resources of each of the engines. Only one consumer/resource pair can utilize one of the six busses per cycle. The consumer/resource pairs contend with each other for use of the six busses through an OR-AND and a threshold detection logic of FIG. 10. However the same orchestration for a shared multi-point busses configuration can be achieved using the reservation adder and threshold limit or process, as further described in the discussion of FIG. 9.

The orchestrators 21-23 comprise controlled entities that direct the routing of a resource to a consumer. For example, in one embodiment, an orchestrator can be a thread scheduler that schedules a resource for transfer through the interconnect to a consumer that is ready for execution. The orchestrator (e.g., thread scheduler) identifies the correct resource, reserves the necessary bus, and causes the transfer of that resource to a selected consumer. In this manner, the orchestrator monitors the readiness of instructions and selects the execution units that will be used to execute the instructions. This information is used to orchestrate the transfer of the resource across the interconnect to the selected execution units (e.g., selected consumer) by contending the requests at the interconnect using the reservation and allocation logic as illustrated by either of FIG. 9 or FIG. 10. In this manner, the execution units of the consumers themselves are treated as resources that need to be contended for by the orchestrators using similar resource reservation and allocation methods as illustrated for the interconnect wherein the execution units are reserved and allocated by contending the requests that come from all orchestrators using either of the reservation and allocation logic of FIG. 9 or FIG. 10.

The interconnect comprises a routing matrix that allows a plurality of resource consumers, in this case, a plurality of cores (e.g., the address calculation and execution units 121-124), to access a resource, in this case data, that may be stored at any point in the fragmented cache hierarchy (e.g., L1 cache, load store buffer and L2 cache). The cores can similarly access data that may be stored at any of the segmented register files. Thus, the cores have access to data stored in any of the fragments and to data stored in any of the segments through the interconnect structure 30. In one embodiment, the interconnect structure comprises two structures, the memory interconnect 110a and the execution interconnect 110b, as shown and described above in the discussion of FIG. 1B.

FIG. 2 also shows the plurality of local interconnects 40-42. The local interconnects 40-42 comprise a routing matrix that allows resource consumers from adjacent partitionable engines to quickly access resources of immediately adjacent partitionable engines. For example, one core can use a local interconnect 40 to quickly access resources of the adjacent partitionable engine (e.g., register file, load store buffer, etc.).

Thus, the interconnect structure itself comprises a resource that must be shared by each of the cores of each of the partitionable engines. The interconnect structure 30 and the local interconnect structures 40-42 implement an interconnect structure that allows cores from any of the partitionable engines to access resources of any other of the partitionable engines. This interconnect structure comprises transmission lines that span all of the partitionable engines of the integrated circuit device, in the case of the interconnect structure, and span between engines of the integrated circuit device, in the case of the local interconnect structure.

Embodiments of the present invention implement a non-centralized access process for using the interconnects and the local interconnects. The finite number of global buses and local buses comprise resources which must be efficiently shared by the orchestrators. Additionally, a non-centralized access process is used by the orchestrators to efficiently share the finite number of ports that provide read/write access to the resources of each of the partitionable engines.

In one embodiment, the non-centralized access process is implemented by the orchestrators reserving a bus (e.g., a local interconnect bus or an interconnect bus) and a port into the desired resource. For example, orchestrator 21 needs to reserve an interconnect and a port in order for consumer 1 to access resource 3, while orchestrator 22 to needs to reserve an interconnect and the port in order for consumer for to access resource 2.

Figure 3:
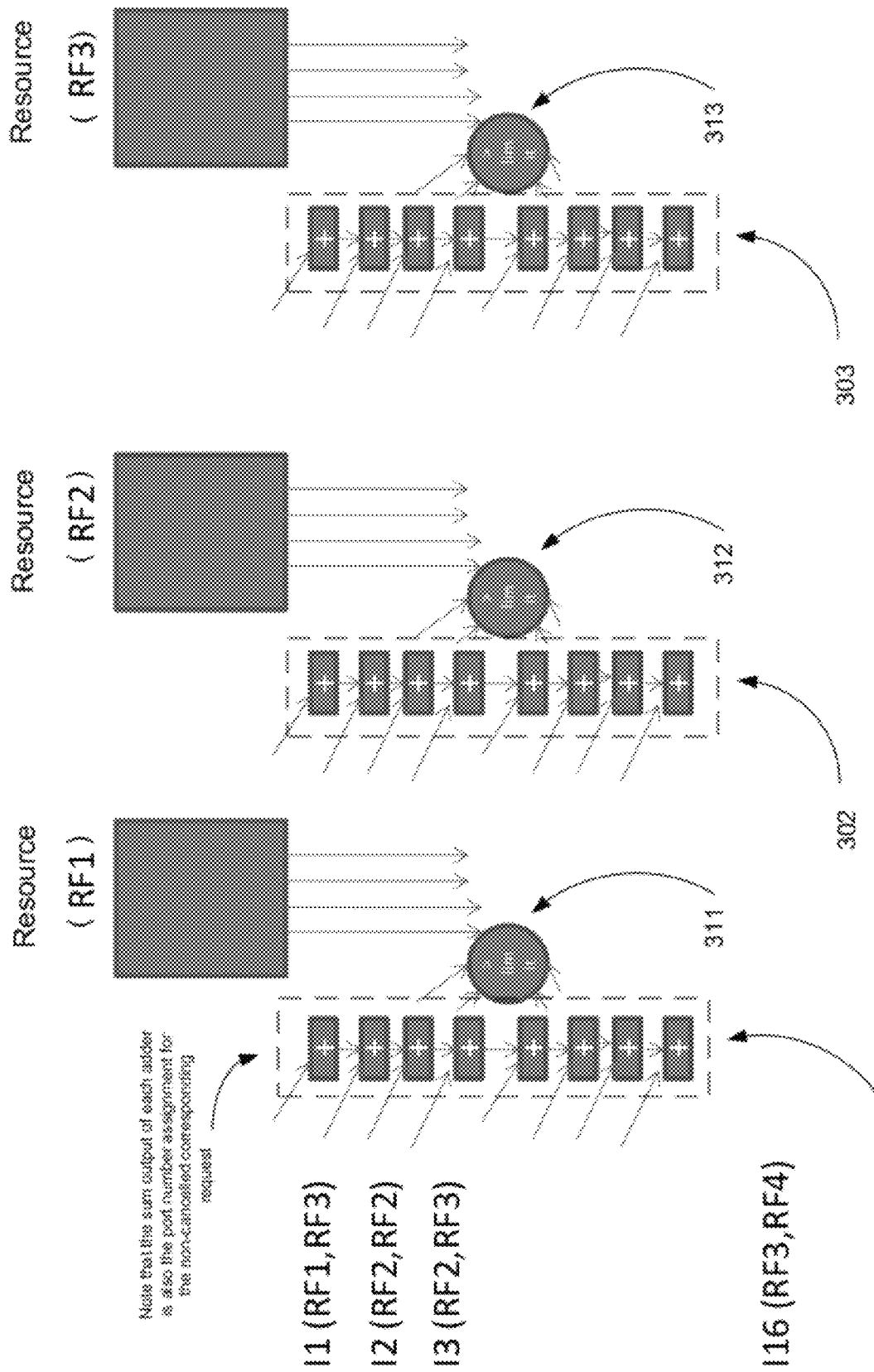
FIG. 3 shows components comprising a resource reservation mechanism that implements efficient access to a contested resource in accordance with one embodiment of the present invention.

FIG. 3 shows components comprising a resource reservation mechanism that implements efficient access to a contested resource in accordance with one embodiment of the present invention. As shown in FIG. 3, three reservation adders 301-303 are shown coupled to threshold limiters 311-313, which control access to each of the four ports for each of the three resources. Each adder output sum (if not canceled) also serves as the port selector for each of the accesses, such that each request that succeeds can use the port number indicated by the sum at the output of that request adder. It should be noted that as indicated in the FIG. 3 diagram, the sum of each depicted adder is also the assigned port number for the non-cancelled corresponding request.

Figure 9:
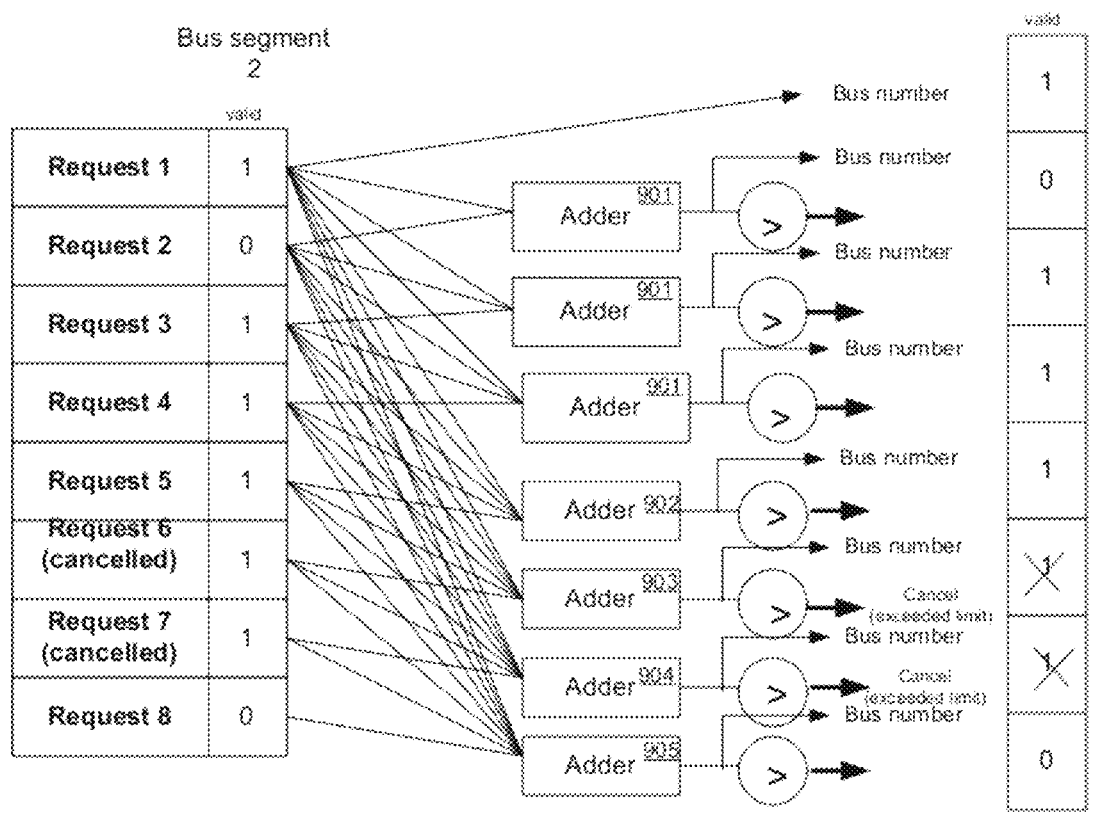
FIG. 9 shows a diagram of an exemplary logic implementation that implements the functionality of the table of FIG. 7 in accordance with one embodiment of the present invention.

It should be noted that this port allocation and reservation problem can be illustrated similar to the bus segment allocation table of FIG. 7 and thus its implementation logic can also be similar to FIG. 9 wherein each segment in this case reflects a register file segment instead of a bus segment. With the same analogy in this case, an instruction trying to access multiple register file segments can only succeed if it can reserve all its register segments requests, and will fail if any register segment access for that instruction is canceled, similar to the illustrations of the bus segments in FIG. 7.

Embodiments of the present invention implement a non-centralized access process for using the interconnects and the local interconnects. Requests, accesses and controls can be initiated for shared interconnects, resources or consumers by multiple non-centralized fetchers, senders, orchestrators, or agents. Those non centralized requests, accesses and controls contend at the shared resources using variations of methods and logic implementation as described in this invention depending on the topologies and structures of those shared resources. By way of example, the resources of the engines and their read/write ports need to be efficiently shared by the cores. Additionally, the finite number of global buses and local buses comprise resources that need to be efficiently shared. In the FIG. 3 embodiment, the non-centralized access process is implemented through reservation adders and threshold limiters. In one embodiment, at each contested resource, a reservation adder tree and a threshold limiter control access to that contested resources. As used herein, the term contested resource refers to read write ports of a load store buffer, memory/cache fragment, register file segment or L2 cache, a global buses reservation, or local buses reservation.

A reservation adder and a threshold limiter control access to each contested resource. As described above, to access a resource, a core needs to reserve the necessary bus and reserve the necessary port. During each cycle, orchestrators attempt to reserve the resources necessary to execute their pending instruction. For example, for an orchestrator scheduling an instruction I1 shown in FIG. 3, that orchestrator will set a flag, or a bit, in the reservation adder of its needed resource. In this case a bit is set in register file 1 and in register file 3. Other orchestrators will similarly set bits in the reservation adders of their needed resource. For example, a different orchestrator for instruction 12 sets two bits for register file 2. As the orchestrators request their needed resources the reservation adders sum the requests until they reach the threshold limiter. In the FIG. 4 embodiment, there are four ports for each of the resources. Hence, the reservation adders will accept flags from reservation requests until the four ports are all reserved. No other flags will be accepted.

An orchestrator will not receive confirmation to execute its instruction unless all of its flags necessary to execute the instruction are set. Hence, the orchestrator will receive confirmation to execute the instruction if the flags for the necessary buses are set and the flags for the necessary read write ports are set. If a cancel signal is received for any of the flags, all flags for that orchestrator's request are cleared, and the request is queued until the next cycle.

In this manner, each of the orchestrators contends with each other for the resources on a cycle by cycle basis. Requests that are canceled are queued and given priority in the next cycle. This ensures that one particular core is not locked out of resource access for large number of cycles. It should be noted that the resources in the proposed implementations get assigned automatically to the resources, for example if the request succeeds in obtaining a resource (e.g., it is not canceled by the adder and threshold logic) then the adder sum output corresponding to that request represents the resource number assigned to that request, thus completing the resource assignment without requiring any further participation from the orchestrators. This reservation and allocation adder and threshold limiters fairly balance access to contested resources in a decentralized manner (e.g., there is no need for requestors/orchestrators to actively participate in any centralized arbitration). Each remote orchestrator sends its requests to the shared resources, those requests that succeed will be granted resources/buses automatically.

Figure 4:
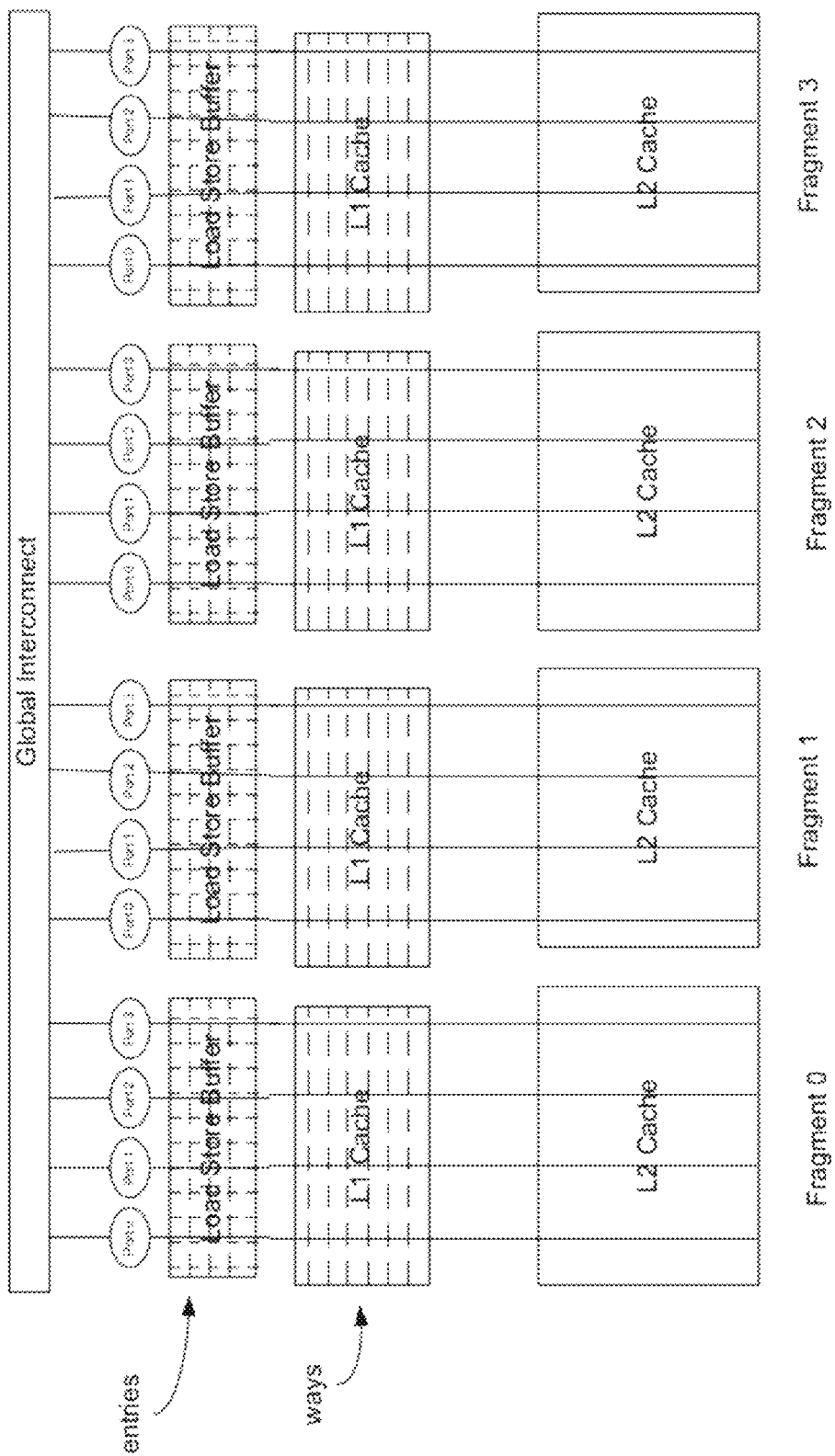
FIG. 4 shows the interconnect and the ports into the memory fragments in accordance with one embodiment of the present invention.

FIG. 4 shows the interconnect and the ports into the memory fragments in accordance with one embodiment of the present invention. As depicted in FIG. 4, each memory fragment is shown with four read write ports that provide read/write access to the load store buffer, the L1 cache, and the L2 cache. The load store buffer includes a plurality of entries and the L1 cache includes a plurality of ways.

As described above, embodiments of the present invention implement a non-centralized access process for using the interconnects and the local interconnects. The finite number of global buses and local buses comprise resources which must be efficiently shared by the cores. Thus, a reservation adder and a threshold limiter control access to each contested resource, in this case, the ports into each fragment. As described above, to access a resource, a core needs to reserve the necessary bus and reserve the necessary port.

Figure 5:
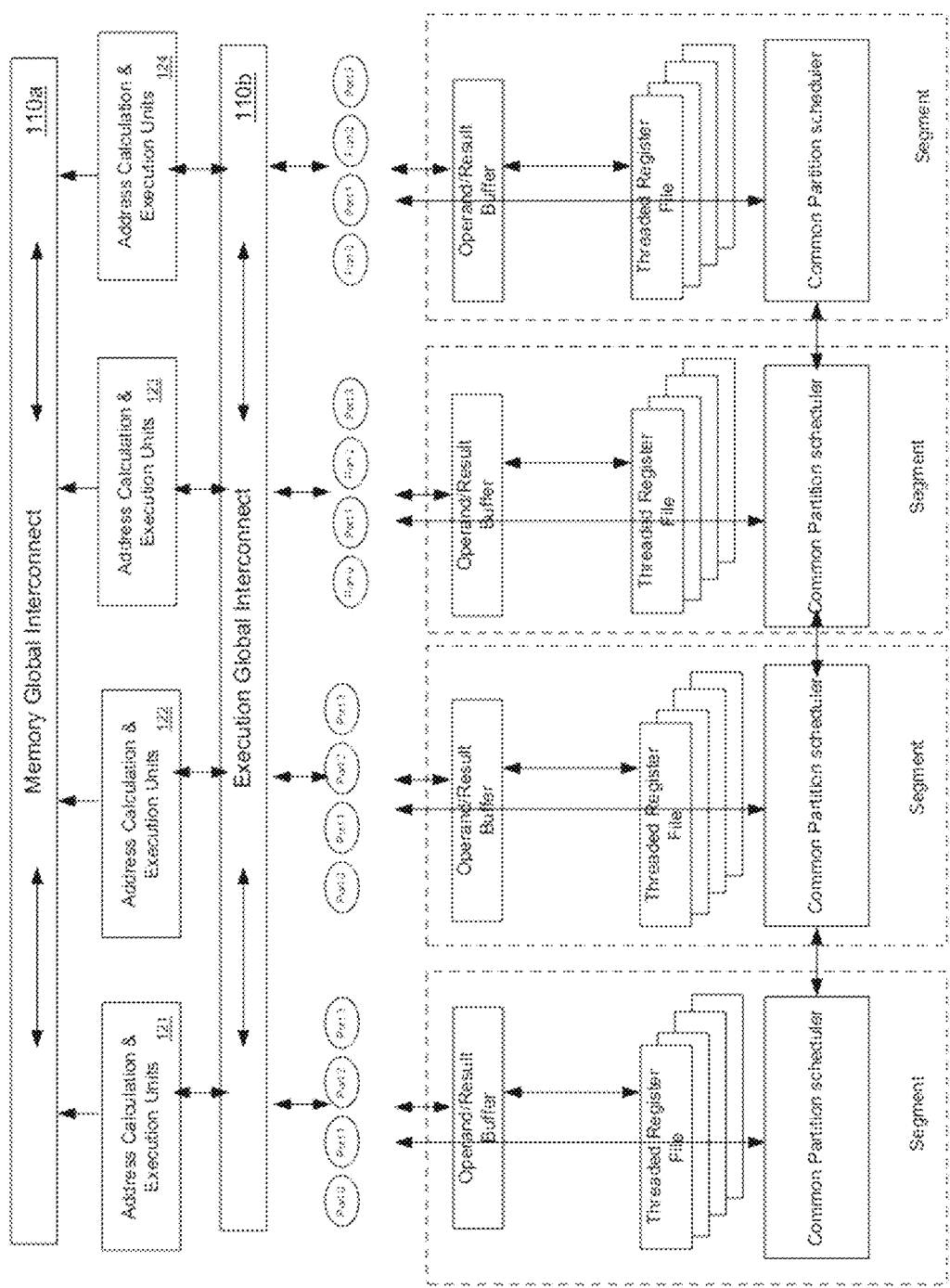
FIG. 5 shows the interconnect and the ports into the segments in accordance with one embodiment of the present invention.

FIG. 5 shows the interconnect and the ports into the segments in accordance with one embodiment of the present invention. As depicted in FIG. 5, each segment is shown with 4 read write ports that provide read/write access to the operand/result buffer, threaded register file, and common partition or scheduler. The FIG. 5 embodiment is shown as including a common partition or scheduler in each of the segments. In this embodiment, the common partition scheduler is configured to function in cooperation with the global front end fetch and scheduler shown in FIG. 1B.

The non-centralized access process for using the interconnects and the local interconnects employ the reservation adder and a threshold limiter control access to each contested resource, in this case, the ports into each segment. As described above, to access a resource, a core needs to reserve the necessary bus and reserve the necessary port.

Figure 6:
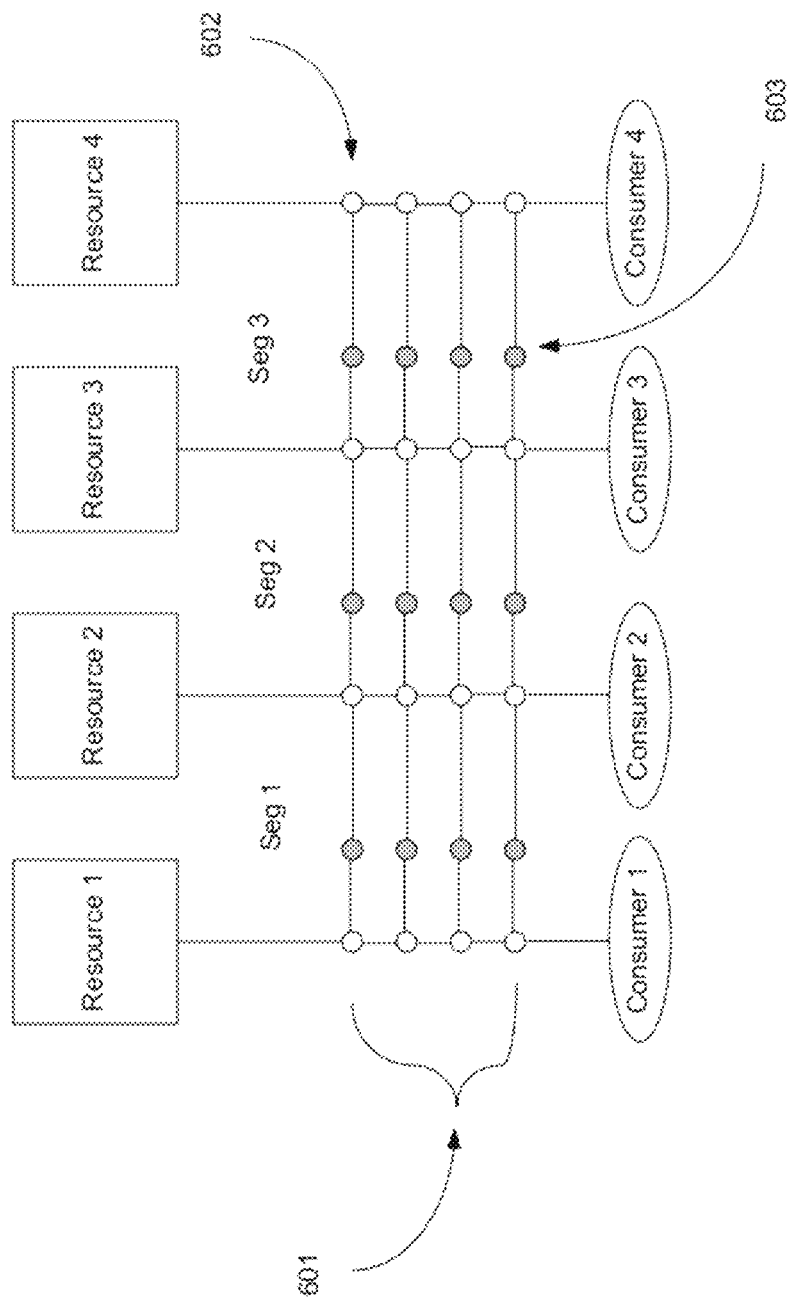
FIG. 6 shows a diagram depicting a segmented interconnect in accordance with one embodiment of the present invention.

FIG. 6 shows a diagram depicting a segmented interconnect 601 in accordance with one embodiment of the present invention. As shown in FIG. 6, an interconnect 601 is shown connecting resources 1-4 to consumers 1-4. The interconnect 601 is also shown as comprising segments 1, 2, and 3.

FIG. 6 shows an example of a fetch model interconnect structure. In the FIG. 6 embodiment, there are no orchestrators. In this embodiment, the resources are contended for by the consumers, as they attempt to fetch the necessary resources to support consumption (e.g., execution units). The consumers send the necessary fetch requests to the reservation adders and threshold limiters.

The interconnect structure comprises a plurality of global segmented buses. The local interconnect structure comprises a plurality of locally connected engine to engine buses. Accordingly, to balance costs in both performance and fabrication, there are a finite number of global buses and a finite number of local buses. In the FIG. 6 embodiment, four globally segmented buses are shown.

In one embodiment, the global buses can be segmented into 3 portions. The segmentation allows the overall length of the global buses to be adjusted in accordance with the distance of the global access. For example, an access by consumer 1 to resource 4 would span the entire bus, and thus not be segmented. However, an access by consumer 1 to resource 3 would not span the entire bus, and thus the global bus can be segmented between resource 3 and resource 4.

In the FIG. 6 embodiment, the interconnect 601 is shown as having 4 buses. The segmentation can be implemented via, for example, a tri-state buffer. The segmentation results in faster and more power efficient transmission characteristics of the bus. In the FIG. 6 embodiment, the buses each include one directional tri-state buffers (e.g., buffer 602) and bidirectional tri-state buffers (e.g., buffer 603). The bidirectional tri-state buffers are shaded in the FIG. 6 diagram. The buffers enable the interconnect to be segmented to improve its signal transmission characteristics. These segments also comprise resources which must be contested for and allocated by the resource consumers. This process is illustrated in the FIG. 7 diagram below.

FIG. 7 shows a table that illustrates the manner which requests for segments of the interconnect 601 are contested for and allocated in accordance with one embodiment of the present invention. The left-hand side of the FIG. 7 table shows how requests are ordered as they are received within the cycle. In this case, eight requests are shown. When a request from a resource consumer wants to reserve a segment, that consumer places a one in the requested segment's reservation table. For example, for request 1, consumer 1 wants to reserve segment 1 and segment 2 in order to access resource 3. Thus, consumer 1 sets a flag, or a bit, in the request column for segment 1 and segment 2, while the column for segment 3 remains zero. In this manner, requests are added within the columns. Requests are allocated until they exceed the number of global buses, in this case four. When the requests exceed the number of global buses, they are canceled. This is shown by request number 6 and request number 7 having been canceled because they exceed the limit.

FIG. 8 shows a table that illustrates the manner in which requests for a point-to-point bus are handled in accordance with one embodiment of the present invention. As opposed to the table of FIG. 7, the table of FIG. 8 shows how only one consumer and only one resource can use a point-to-point bus (e.g., the interconnect illustrated in FIG. 2). The requests come from the multiple orchestrators that want to route resources through the point-to-point buses. In this case, the point-to-point bus shows the number of possible consumer resource pairs (e.g., the six columns proceeding from left to right) and a number of requests 1-8 proceeding from top to bottom. Because only one resource consumer pair can use a bus at any given time, the column can only have one request flag before all of the requests are canceled as exceeding the limit. Thus, in each column, the first request is granted while all subsequent requests are canceled as exceeding the limit. Since there are six global point-to-point buses, there are six columns which can accommodate six different requests in each cycle.

FIG. 9 shows a diagram of an exemplary logic implementation that implements the functionality of the table of FIG. 7 in accordance with one embodiment of the present invention. As described above, the table of FIG. 7 illustrates the manner which requests for segments of the interconnect 601 are contested for and allocated in accordance with one embodiment of the present invention. Specifically, FIG. 9 shows the logic for allocating the column associated with bus segment 2 from the table of FIG. 7.

The FIG. 9 embodiment shows a plurality of parallel adders 901-905. Both requests are canceled if the limit is exceeded. As described above, there are 4 buses which can be used to implement segment 2. The first four requests can be processed and granted because even if they are all flagged, by marking request with a logical one, they will not exceed the limit. The remaining requests need to be checked whether they will exceed the limit. This is done by the parallel adders 901-905. Each adder after the first three rows adds itself and all previous rows and checks against the limit. If the adder exceeds the limit, the request is canceled, as shown. The adder sum output also determines which particular bus segment is allocated to each request. In the FIG. 9 embodiment, this is by bus segment number as shown.

Figure 10:
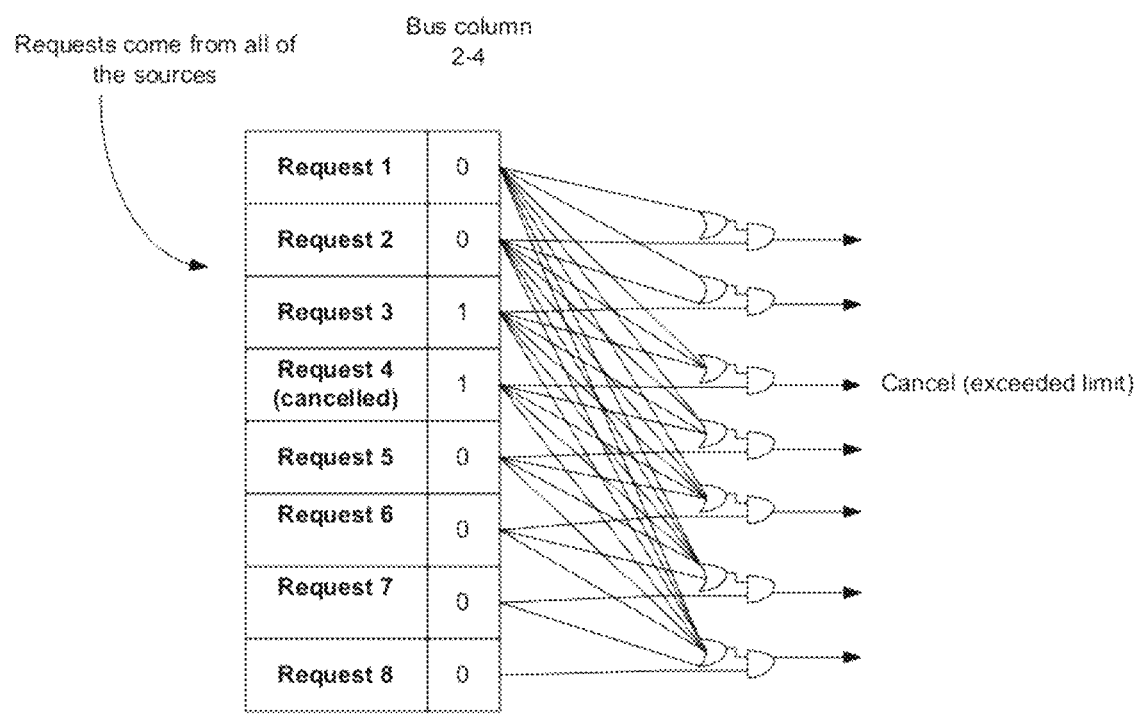
FIG. 10 shows a diagram of an exemplary logic implementation that implements the functionality of the manner in which requests for a point-to-point bus are handled in accordance with one embodiment of the present invention.

FIG. 10 shows a diagram of an exemplary logic implementation that implements the functionality of the manner in which requests for a point-to-point bus are handled in accordance with one embodiment of the present invention. The table of FIG. 8 shows how only one consumer and only one resource can use a point-to-point bus. Specifically, FIG. 10 shows the logic for allocating the column associated with bus column 2-4 from the table of FIG. 8.

The FIG. 10 embodiment shows a plurality of multi-input OR gates coupled to AND gates, as shown. As described above, one consumer and only one resource can use a point-to-point bus. Because only one resource/consumer pair can use a bus at any given time, the column can only have one request flag before all of the subsequent requests are canceled as exceeding the limit. Thus, in each column, the first request is granted while all subsequent requests are canceled as exceeding the limit. In the FIG. 10 embodiment, each row of the column is logically combined through an OR operation with all of the previous rows of the column and then is logically combined through an AND operation with itself. Thus, if any previous row reserves the column, all subsequent requests are canceled, as shown.

Figure 11:
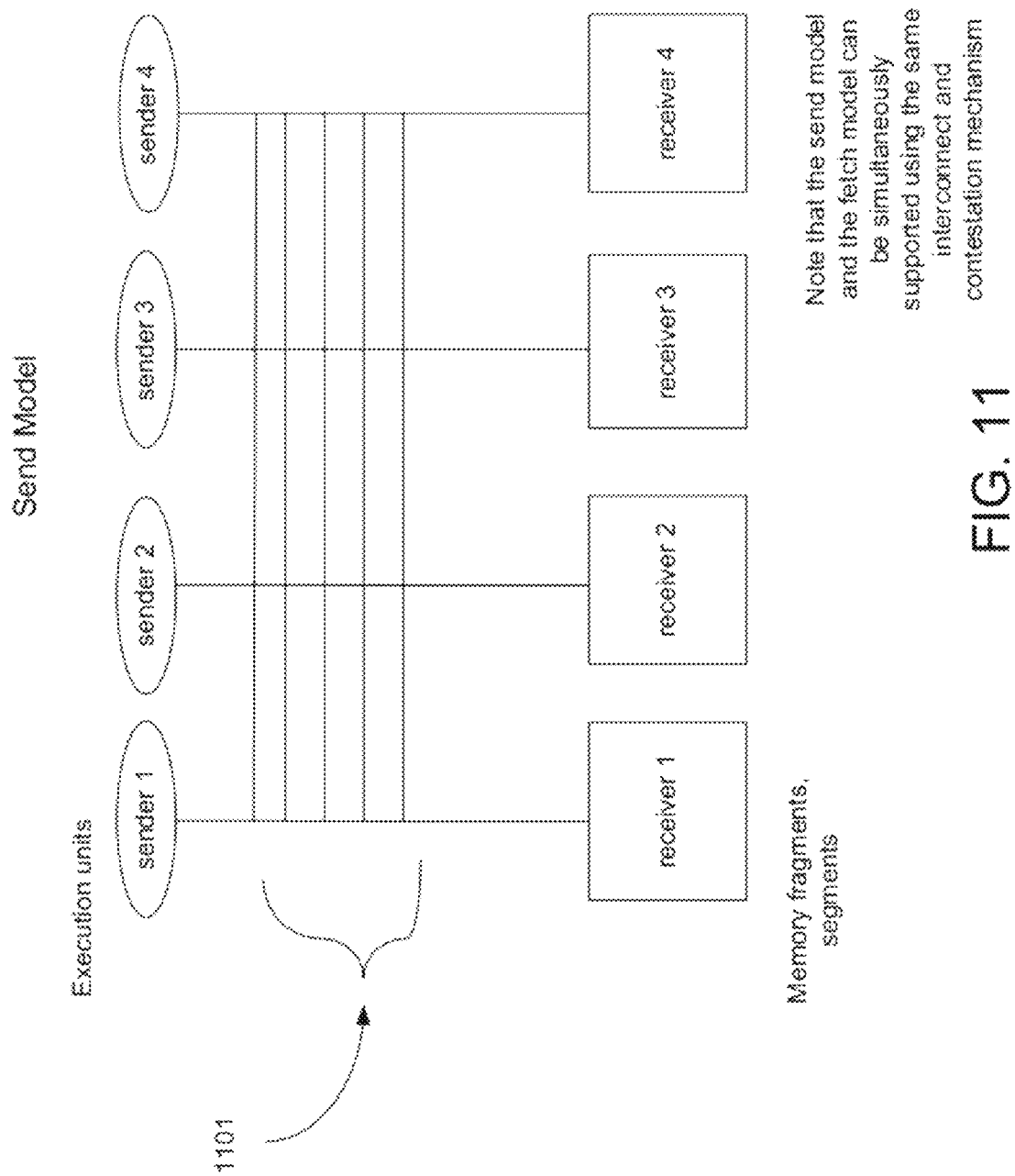
FIG. 11 shows a diagram of an interconnect in accordance with one embodiment of the present invention.

FIG. 11 shows a diagram of an interconnect 1101 in accordance with one embodiment of the present invention. The interconnect 1101 comprises five shared interconnect structures that are shared by each of the senders and each of the receivers.

The FIG. 11 embodiment shows an example of a send model interconnect structure. For example, the senders comprise the execution units of the engines. The receivers comprise the memory fragments and the register segments of the engines. In this model, the senders issue the necessary requests to the reservation adders and the threshold limiters to reserve resources to implement their transfers. These resources include ports into the receivers and a plurality of shared buses of the interconnect 1101.

Figure 12:
FIG. 12 shows a table illustrating the manner in which the sender model interconnect structure of FIG. 11 functions in accordance with one embodiment of the present invention.

FIG. 12 shows a table illustrating the manner in which the sender model interconnect structure of FIG. 11 functions in accordance with one embodiment of the present invention. The table shows the requests as they are received from all of the senders. The right hand side of the table shows the interconnect allocation. Since the interconnect 1101 comprises five shared buses, the first five requests are granted, and any further requests are canceled as exceeding the limit. Thus, request 1, request 3, request 4, request 5, and request 6 are granted. However, request 7 is canceled as having exceeded the limit.

Figure 13:
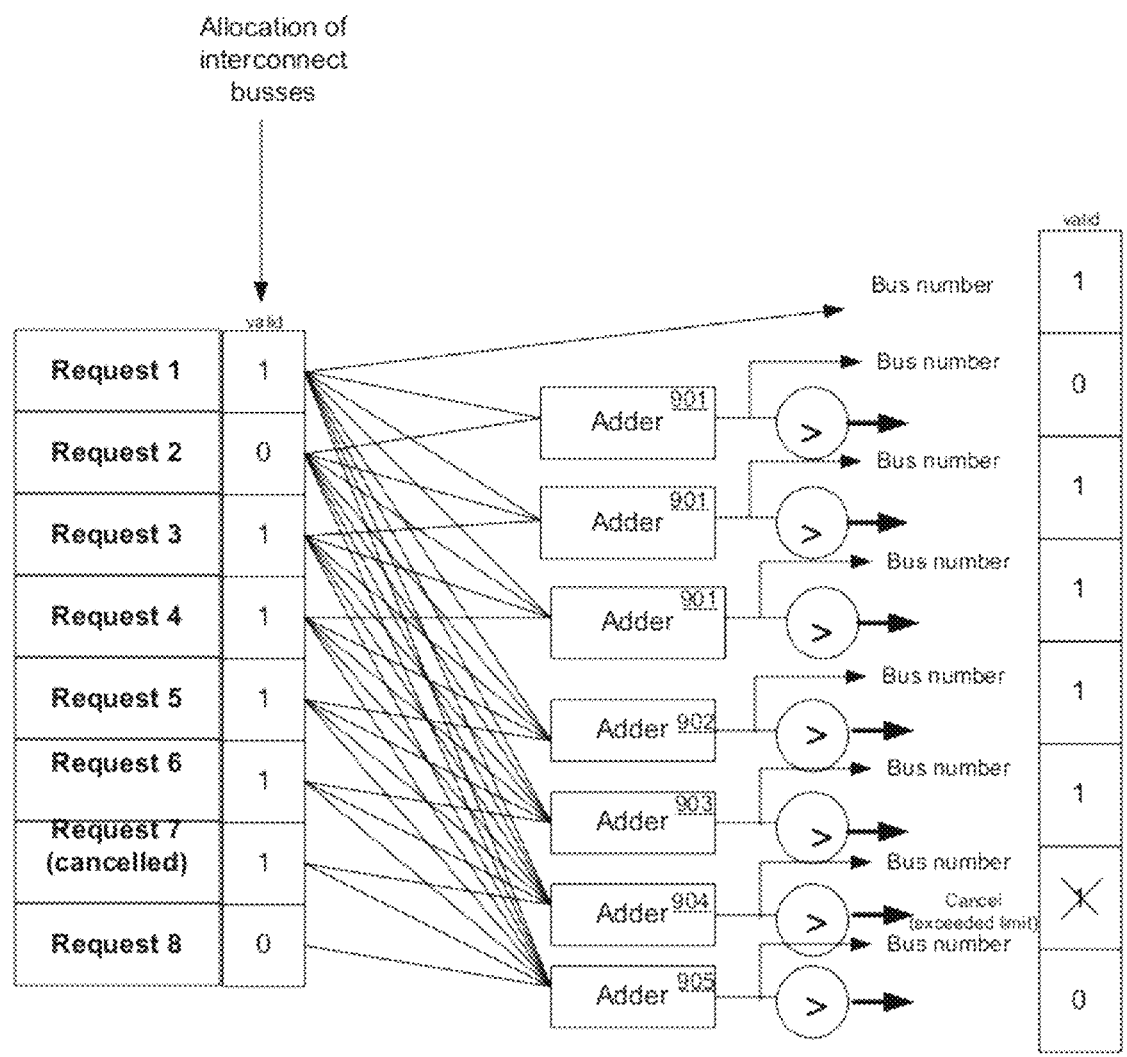
FIG. 13 shows a diagram of an exemplary logic implementation that implements the functionality of the manner in which requests for shared bus interconnect structure are handled in accordance with one embodiment of the present invention.

FIG. 13 shows a diagram of an exemplary logic implementation that implements the functionality of the manner in which requests for shared bus interconnect structure are handled in accordance with one embodiment of the present invention.

FIG. 13 shows how the allocation of the interconnect buses is handled by the adders 901-905. This logic implements the table of FIG. 12. As requests are received, corresponding flags are set. The adders add their respective flag with all prior flags. Flags will be granted along with their bus number by the adder so long as they do not exceed the limit, which is five in this case. As described above, any requests that exceed the limit are canceled.

It should be noted that the sender model and the fetch model of an interconnect can be simultaneously supported using a common interconnect structure and a common contesting mechanism. This is shown by the similarity of the diagram of FIG. 13 to the diagram of FIG. 9.

It should be noted that current presentations in the current invention of different models of communications (Sender, Fetch, Orchestrator, etc.) and different interconnect topologies (point to point busses, multi-bus, and segmented busses, etc.) should not be interpreted as the only communication modes or the only interconnect topologies applicable to the current invention. To the contrary, one skilled in the art can easily mix and match the different contestation, reservation and allocation techniques of the current invention with any communication mode or bus topology.

It should be further noted that the described embodiments of the current invention present interconnects alongside the resources. This should be understood as a generalized illustration meant to show a broader set of possibilities for implementing the current invention, but it should be noted that the meaning of interconnects as used in the current invention is not limited to data interconnects between different cores or compute engines or between register files or memory fragments, but refers also to the control interconnects that carry the requests to the resources and the physical interconnects that carry data from structures (i.e., register file ports, memory ports, array decoder busses, etc.). This broader meaning is illustrated in FIG. 3, for example, which shows the interconnects only as the ports coming out of each register file.

Figure 14:
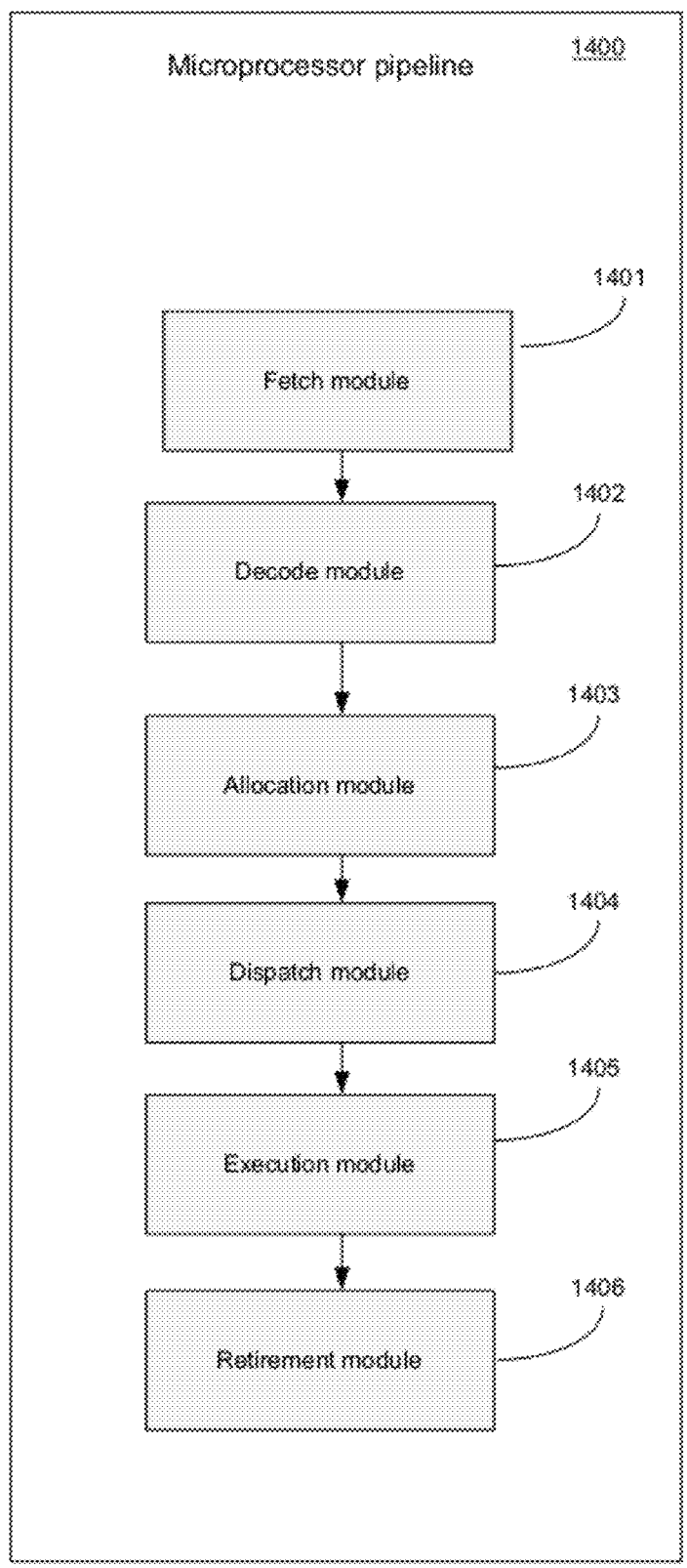
FIG. 14 shows a diagram of an exemplary microprocessor pipeline in accordance with one embodiment of the present invention.

FIG. 14 shows a diagram of an exemplary microprocessor pipeline 1400 in accordance with one embodiment of the present invention. The microprocessor pipeline 1400 includes a fetch module 1401 that implements the functionality of the process for identifying and extracting the instructions comprising an execution, as described above. In the FIG. 14 embodiment, the fetch module is followed by a decode module 1402, an allocation module 1403, a dispatch module 1404, an execution module 1405 and a retirement module 1406. It should be noted that the microprocessor pipeline 1400 is just one example of the pipeline that implements the functionality of embodiments of the present invention described above. One skilled in the art would recognize that other microprocessor pipelines can be implemented that include the functionality of the decode module described above.

For purposes of explanation, the foregoing description refers to specific embodiments that are not intended to be exhaustive or to limit the current invention. Many modifications and variations are possible consistent with the above teachings. Embodiments were chosen and described in order to best explain the principles of the invention and its practical applications, so as to enable others skilled in the art to best utilize the invention and its various embodiments with various modifications as may be suited to their particular uses.

What is claimed is:

1. A method for decentralized resource allocation in an integrated circuit, comprising:
    receiving a plurality of requests from one or more resource consumers of a plurality of partitionable engines to access a plurality of resources in a given cycle, wherein the resources are spread across the plurality of partitionable engines and are accessed via a global interconnect having a finite number of buses accessible each clock cycle, wherein the resources comprise at least one of register file segments and memory fragments of each of the partitionable engines, and read/write ports into the memory fragments and the register file segments of each of the partitionable engines, and wherein the resource consumers comprise at least one of execution units or address calculation units of each of the partitionable engines and wherein each of a plurality of thread schedulers are operable to identify requested resources and contend for one or more bus of said global interconnect to schedule the plurality of resources for transfer through the global interconnect to said one or more resource consumers, and wherein the plurality of resources are transferred to the one or more resource consumers by:
    at each resource, adding a number of requests for access to the each resource using an adder, wherein the requests for access are made using the plurality of thread schedulers;
    at the each resource, comparing the number of requests against a threshold limiter;
    at the each resource, canceling one or more requests that exceeds the threshold limiter, wherein canceled requests are queued and given priority in a subsequent cycle;
    at the each resource, implementing requests that are not canceled within a current clock cycle, wherein a sum at an output of the adder represents a port number for accessing a resource corresponding to a respective request.

2. The method of claim 1, wherein the adder is a parallel adder.

3. The method of claim 1, wherein a request is not implemented if one of a set of related requests to implement an action is canceled, wherein the set of related requests includes a request for a read/write port and a request for a bus of the global interconnect structure.

4. The method of claim 1, wherein the global interconnect is a dedicated point-to-point bus.

5. The method of claim 1, wherein a single resource and resource consumer pair is operable to utilize one of the finite number of buses each clock cycle.

6. The method of claim 1, wherein the global interconnect comprises a routing matrix operable to allow the one or more resource consumers to access data from any storage location within the plurality of resources.

7. The method of claim 1, wherein each of the plurality of thread schedulers is further operable to monitor a readiness of instructions and select the one or more resource consumers for executing the instructions.

8. In a microprocessor, a method for decentralized resource allocation, comprising:
    receiving a plurality of requests from one or more resource consumers of a plurality of partitionable engines to access a plurality of resources in a given cycle, wherein the resources are spread across the plurality of partitionable engines and are accessed via a global interconnect having a finite number of buses accessible each clock cycle, wherein the resources comprise at least one of register file segments and memory fragments of each of the partitionable engines, and wherein the resource consumers comprise at least one of execution units or address calculation units of each of the partitionable engines and wherein each of a plurality of thread schedulers are operable to identify requested resources and contend for one or more bus of said global interconnect to schedule the plurality of resources for transfer through the global interconnect to said one or more resource consumers, and wherein the plurality of resources are transferred to the one or more resource consumers by:
    at each resource, adding a number of requests for access to the each resource using an adder, wherein the requests for access are made using the plurality of thread schedulers;
    at the each resource, comparing the number of requests against a threshold limiter;
    at the each resource, canceling one or more requests that exceeds the threshold limiter, wherein canceled requests are queued and given priority in a subsequent cycle;
    at the each resource, implementing requests that are not canceled within a current clock cycle, wherein a sum at an output of the adder represents a port number for accessing a resource corresponding to a respective request.

9. The method of claim 8, wherein the resources further comprise read/write ports into the memory fragments and the register file segments of each of the partitionable engines.

10. The method of claim 8, wherein the adder is a parallel adder.

11. The method of claim 8, wherein a request is not implemented if one of a set of related requests to implement an action is canceled, wherein the set of related requests includes a request for a read/write port and a request for a bus of the global interconnect structure.

12. The method of claim 8, wherein the global interconnect is a dedicated point-to-point bus.

13. The method of claim 8, wherein a single resource and resource consumer pair is operable to utilize one of the finite number of buses each clock cycle.

14. The method of claim 8, wherein the global interconnect comprises a routing matrix operable to allow the one or more resource consumers to access data from any storage location within the plurality of resources.

15. The method of claim 8, wherein each of the plurality of thread schedulers is further operable to monitor a readiness of instructions and select the one or more resource consumers for executing the instructions.

16. A microprocessor, comprising:
a plurality of resources having data for supporting the execution of multiple code sequences;
one or more resource consumers of a plurality of partitionable engines to access the plurality of resources in a given cycle wherein the resources are spread across the plurality of partitionable engines; and
a global interconnect having a finite number of buses accessible each clock cycle for coupling the one or more resource consumers with the plurality of resources to access the data and execute the multiple code sequences, wherein the resources comprise at least one of register file segments and memory fragments of each of the partitionable engines, and wherein the resource consumers comprise at least one of execution units or address calculation units of each of the partitionable engines and wherein each of a plurality of thread schedulers are operable to identify requested resources and contend for one or more bus of said global interconnect to schedule the plurality of resources for transfer through the global interconnect to said one or more resource consumers, and wherein the plurality of resources are transferred to the one or more resource consumers by:
at each resource, adding a number of requests for access to the each resource using an adder, wherein the requests for access are made using the plurality of thread schedulers;
at the each resource, comparing the number of requests against a threshold limiter;
at the each resource, canceling one or more requests that exceeds the threshold limiter, wherein canceled requests are queued and given priority in a subsequent cycle;
at the each resource, implementing requests that are not canceled within a current clock cycle, wherein a sum at an output of the adder represents a port number for accessing a resource corresponding to a respective request.

17. The microprocessor of claim 16, wherein the resources further comprise read/write ports into the memory fragments and the register file segments of each of the partitionable engines.

18. The microprocessor of claim 16, wherein the global interconnect is a dedicated point-to-point bus.

19. The microprocessor of claim 16, wherein a single resource and resource consumer pair is operable to utilize one of the finite number of buses each clock cycle.

20. The microprocessor of claim 16, wherein the global interconnect comprises a routing matrix operable to allow the one or more resource consumers to access data from any storage location within the plurality of resources.

21. The microprocessor of claim 16, wherein each of the plurality of thread schedulers is further operable to monitor a readiness of instructions and select the one or more resource consumers for executing the instructions.

\* \* \* \* \*